(12) United States Patent
Ye et al.

(10) Patent No.: US 11,470,448 B2
(45) Date of Patent: Oct. 11, 2022

(54) METHOD AND SYSTEM TO ESTIMATE AND LEARN THE LOCATION OF A RADIO DEVICE

(71) Applicant: Red Point Positioning Corporation, Boston, MA (US)

(72) Inventors: ZhenZhen Ye, Westford, MA (US); Chunjie Duan, Brookline, MA (US)

(73) Assignee: Red Point Positioning Corporation, Boston, MA (US)

( * ) Notice: Subject to any disclaimer, the term of this patent is extended or adjusted under 35 U.S.C. 154(b) by 97 days.

(21) Appl. No.: 16/937,807

(22) Filed: Jul. 24, 2020

(65) Prior Publication Data

US 2021/0029500 A1 Jan. 28, 2021

Related U.S. Application Data

(60) Provisional application No. 62/878,161, filed on Jul. 24, 2019.

(51) Int. Cl.
*H04W 4/029* (2018.01)
*H04W 4/021* (2018.01)
*G01S 5/02* (2010.01)
*G06N 5/04* (2006.01)
*G06N 20/00* (2019.01)

(52) U.S. Cl.
CPC ......... *H04W 4/029* (2018.02); *G01S 5/02525* (2020.05); *G01S 5/02528* (2020.05); *G06N 5/04* (2013.01); *G06N 20/00* (2019.01); *H04W 4/021* (2013.01)

(58) Field of Classification Search
CPC ...... H04W 4/029; H04W 4/021; G06N 20/00; G06N 5/04; G01S 5/02525; G01S 5/02528
See application file for complete search history.

(56) References Cited

U.S. PATENT DOCUMENTS

| | | |
|---|---|---|
| 9,008,685 B1 | 4/2015 | Gold et al. |
| 2002/0159404 A1 | 10/2002 | Raissinia et al. |
| 2004/0176094 A1 | 9/2004 | Kim et al. |

(Continued)

OTHER PUBLICATIONS

"Amendment Under Article 34 / Response to Written Opinion", PCT/US2020/043399, dated May 19, 2021, 15 pages.

(Continued)

*Primary Examiner* — Umair Ahsan
(74) *Attorney, Agent, or Firm* — Guntin & Gust, PLC; Robert Gingher

(57) ABSTRACT

Aspects of the subject disclosure may include, for example, utilizing a Radio Frequency (RF) fingerprint model for a demarcated area associated with a plurality of anchors. A machine learning process is applied to an RF training set that includes RF characteristics for a plurality of messages and locations determined for one or more mobile devices within the demarcated area. The plurality of messages are wirelessly transmitted as part of radio measurement locating processes to determine the mobile device locations. A first location for the first mobile device can be determined based on the RF fingerprint model according to particular RF characteristics of first messages being received by or received from the first mobile device. Other embodiments are disclosed.

19 Claims, 26 Drawing Sheets

(56) References Cited

U.S. PATENT DOCUMENTS

| | | | |
|---|---|---|---|
| 2009/0310585 A1* | 12/2009 | Alizadeh-Shabdiz | ........................ G01S 5/0252 370/338 |
| 2010/0227626 A1* | 9/2010 | Dressler | ................ H04W 64/00 455/456.1 |
| 2011/0053613 A1* | 3/2011 | Zhou | .................... H04W 64/00 455/456.5 |
| 2012/0178472 A1 | 7/2012 | Bevan et al. | |
| 2014/0099970 A1 | 4/2014 | Siomina et al. | |
| 2014/0187268 A1 | 7/2014 | Browne et al. | |
| 2015/0237164 A1 | 8/2015 | Mohammad Mirzaei et al. | |
| 2015/0247915 A1 | 9/2015 | Huang et al. | |
| 2019/0219665 A1 | 7/2019 | Ye et al. | |
| 2020/0033438 A1 | 1/2020 | Isson | |

OTHER PUBLICATIONS

"International Search Report and the Written Opinion", PCT/US2020/043399, dated Nov. 19, 2020, 11 pages.

\* cited by examiner

500

800

1000

1300

1400

1500

1700

1800

METHOD AND SYSTEM TO ESTIMATE AND LEARN THE LOCATION OF A RADIO DEVICE

CROSS-REFERENCE TO RELATED APPLICATION(S)

The present application claims the benefit of priority to U.S. Provisional Application No. 62/878,161 filed on Jul. 24, 2019, which is hereby incorporated herein by reference in its entirety.

FIELD OF THE DISCLOSURE

The subject disclosure relates to a method and apparatus for configuring devices to enable determination of location information.

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, trajectory of objects, speed of objects, positions of objects, or combinations thereof.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining location information for mobile devices utilizing anchors and RF channel characteristics. In one or more embodiments, information (e.g, calculated locations, RF channel characteristic(s) of messages, radio measurements, and so forth) can be collected from a real time location system which utilizes instantaneous radio measurements of messages communicated in the system for location determination, such as described with respect to FIGS. 1-11. In one or more embodiments, an RF fingerprint(s) (e.g., RF signature(s)) can be generated from the collected information that describes, or is otherwise indicative of, one or more RF channel characteristics for positions or zones within a particular area, such as a demarcated area associated with a plurality of anchors. In one or more embodiments, the RF fingerprint can be based on an RF fingerprint model generated in a number of ways, such as via machine learning. In one or more embodiments, the RF fingerprint model can also be based on other data for the various locations, such as instantaneous radio measurements. Other embodiments are described in the subject disclosure.

Figure 1:
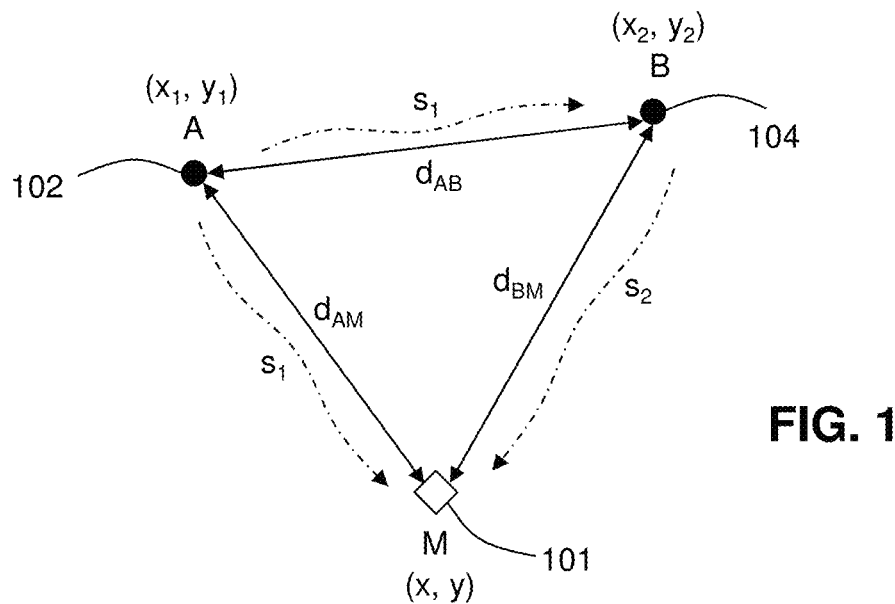
FIG. 1 is a block diagram illustrating an exemplary, non-limiting embodiment of a mobile tag and anchors for determining location information between the mobile tag and the anchors in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In one or more embodiments, the devices and functions described with respect to FIG. 1, which can include messaging for performing location determination, can also be utilized in generating an RF fingerprint model(s) for a demarcated area according to RF channel characteristics, calculated locations and/or other collected data so that location determination can be performed according to the RF fingerprint model(s).

Figure 2:
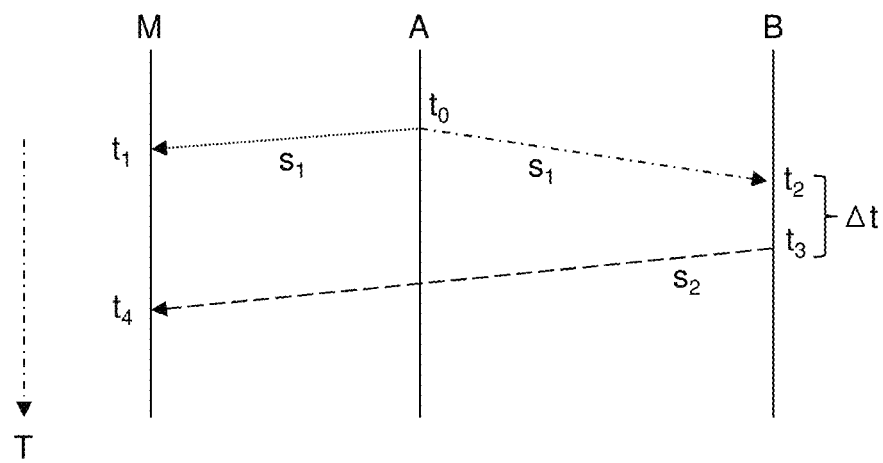
FIG. 2 is a block diagram illustrating an exemplary, non-limiting embodiment of a timing diagram for determining location information between the mobile tag and the anchors of FIG. 1 in accordance with various aspects described herein.

In an embodiment, anchor 102 can be configured to transmit a first wireless signal ($s_1$) that can be received by anchor 104 and the mobile tag 101. The timing of transmission by anchor 102 and reception by the mobile tag 101 and anchor 104 of the first wireless signal ($s_1$) is depicted in FIG. 2.

In an embodiment, anchor 102 transmits the first wireless signal ($s_1$) at time $t_0$, which in turn is received by the mobile tag 101 at time $t_1$ and anchor 104 at time $t_2$. Anchor 104 can be configured to transmit a second wireless signal ($s_2$) at time $t_3$, which is received by the mobile tag 101 at time $t_4$. The mobile tag 101 can be configured to use a time difference of arrival (TDOA) measurement technique based on the first and second wireless signals ($s_1$, $s_2$) to determine location information between the mobile tag 101 and the anchors 102 and 104 as will be described below.

In an embodiment, anchors 102 and 104 are stationary. Accordingly, their x-y coordinates and the distance between anchors 102 and 104 ($d_{AB}$) can be made known to the mobile tag 101 either by a look-up table provisioned into a memory of the mobile tag 101 or by including such information in the first wireless signal ($s_1$), which can then be obtained by the mobile tag 101. Additionally, the mobile tag 101 can be configured to include in its look-up table the receive time and transmit time ($t_2$, $t_3$) of anchor 104 and/or a time difference between these times ($\Delta t = t_3 - t_2$), or can receive this information in the second wireless signal ($s_2$) transmitted by anchor 104. The equations that follow can be used to calculate a first possible location of the mobile tag 101 relative to anchor pairs 102, 104.

The distance between anchor 102 and the mobile tag can be represented as, $$d_{AM} = c(t_1 - t_0) \quad \text{(EQ 1)},$$

where c is the speed of light constant. Similarly, the distance from anchor 102 to anchor 104 can be represented as, $$d_{AB} = c(t_2 - t_0) \quad \text{(EQ 2)}.$$

Additionally, the distance from anchor 104 to the mobile tag 101 can be represented as, $$d_{BM} = c(t_4 - t_3) \quad \text{(EQ 3)}.$$

The total distance traveled by the first wireless signal ($s_1$) from anchor 102 to anchor 104 and the second wireless signals ($s_2$) from anchor 104 to mobile tag 101 can be represented as, $$d_{AB} + d_{BM} = c(t_2 - t_0 + t_4 - t_3) \quad \text{(EQ 4A)}.$$

To eliminate variable $t_0$, equation EQ1 can be subtracted from equation EQ 4A, resulting in, $$d_{AB} + d_{BM} - d_{AM} = c(t_2 - t_1 + t_4 - t_3) \quad \text{(EQ 4B)}.$$

Substituting $\Delta t = t_3 - t_2$ into EQ 4B results in equation, $$d_{AB} + d_{BM} - d_{AM} = c(t_4 - t_1 - \Delta t) \quad \text{(EQ 4C)}.$$

Since $d_{AB}$ is a constant known to the mobile tag 101 and the time variables of the factor $c(t_4 - t_1 - \Delta t)$ are also known to the mobile tag 101, EQ 4C can be rewritten as, $$d_{BM} - d_{AM} = \Delta d_1 \quad \text{(EQ 5)},$$

where $\Delta d_1 = c(t_4 - t_1 - \Delta t) - d_{AB}$, which are constants known to mobile tag 101. Furthermore, in an example of two-dimensional (2D) space, the distance between anchor 102 and the mobile tag 101 can be represented as, $$d_{AM} = \sqrt{(x-x_1)^2 + (y-y_1)^2},$$

and the distance between anchor 104 and the mobile tag 101 can be represented as, $$d_{BM} = \sqrt{(x-x_2)^2 + (y-y_2)^2}.$$

Substituting $d_{AM}$ and $d_{BM}$ in EQ 5 results in the following equation, $$\sqrt{(x-x_2)^2 + (y-y_2)^2} - \sqrt{(x-x_1)^2 + (y-y_1)^2} = \Delta d_1 \quad \text{(EQ 6)}.$$

Figure 3:
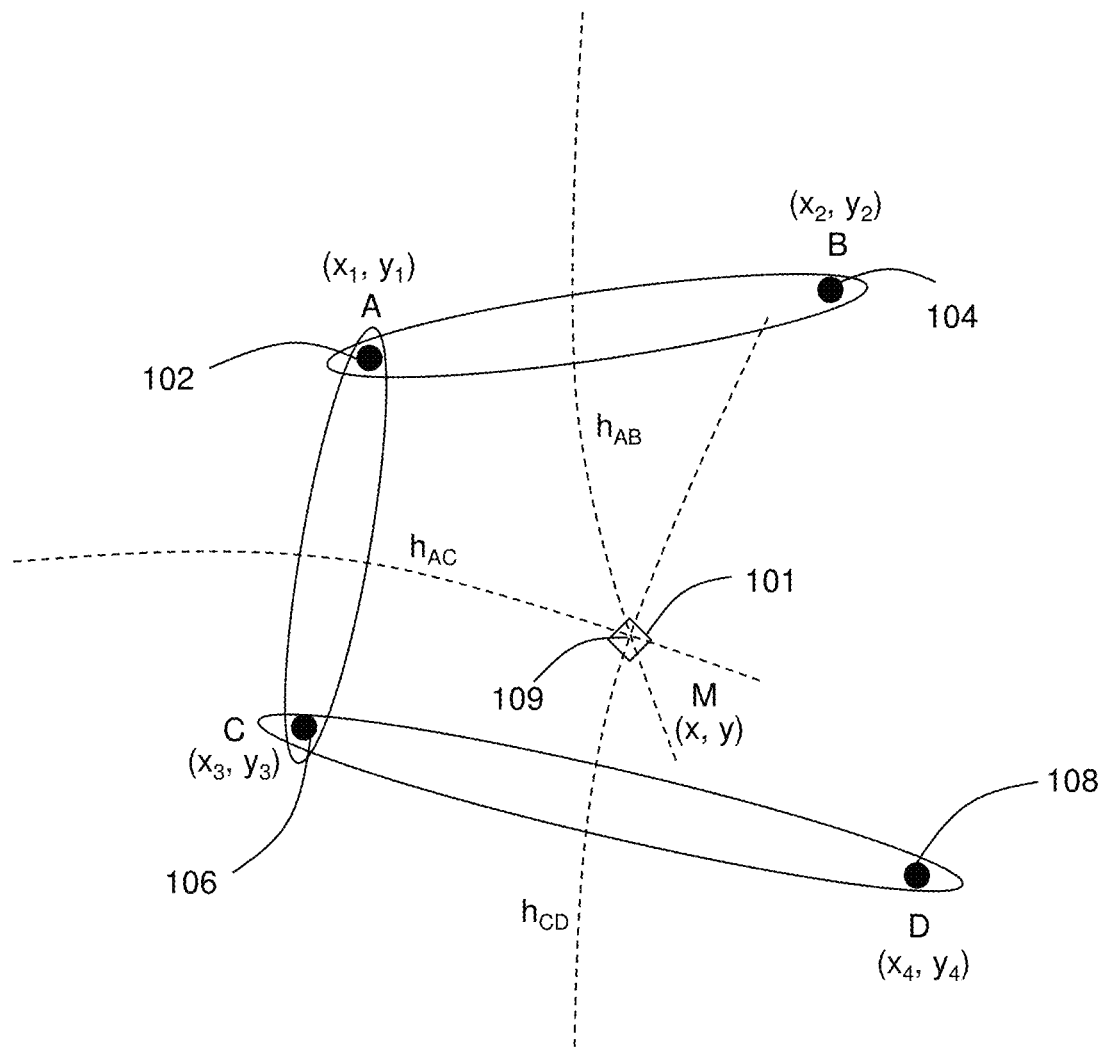
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors pairs 102, 104. Such a hyperbolic curve can be represented as, $$h_{AB} = \Delta d_1 \quad \text{(EQ 7A)},$$

where $h_{AB} = \sqrt{(x-x_2)^2 + (y-y_2)^2} - \sqrt{(x-x_1)^2 + (y-y_1)^2}$. The mobile tag 101 can be further configured to perform the above calculation across other anchor pairs as depicted in FIG. 3. In one or more embodiments, the devices and functions described with respect to FIG. 3, which can include messaging for performing location determination, can also be utilized in generating an RF fingerprint model(s) for a demarcated area according to RF channel characteristics, calculated locations and/or other collected data so that location determination can be performed according to the RF fingerprint model(s). For example, the mobile tag 101 can be configured to determine a hyperbolic curve between anchors 102 and 106 (i.e., anchors A and C) resulting in equation, $$h_{AC} = \Delta d_2 \quad \text{(EQ 7B)},$$

where $\Delta d_2$ is a constant known to mobile tag 101, and where $h_{AC} = \sqrt{(x-x_3)^2 + (y-y_3)^2} - \sqrt{(x-x_1)^2 + (y-y_1)^2}$. Additionally, the mobile tag 101 can be configured to determine a hyperbolic curve between anchors 106 and 108 (i.e., anchors C and D) resulting in equation, $$h_{CD} = \Delta d_3 \quad \text{(EQ 7C)},$$

where $\Delta d_3$ is a constant known to mobile tag 101, and where $h_{CD} = \sqrt{(x-x_4)^2 + (y-y_4)^2} - \sqrt{(x-x_3)^2 + (y-y_3)^2}$. The intersection 109 of hyperbolic curves $h_{AB}$, $h_{AC}$ and $h_{CD}$ corresponding to equations EQ 7A-7C can provide a two-dimensional coordinate location (i.e., x, y) for the mobile tag 101 relative to anchors pairs 102 and 104 (anchors A/B), 106 and 108 (anchors A/C), 106 and 108 (anchors C/D). It will be appreciated that the mobile tag 101 can also be configured to determine a three-dimensional coordinate (i.e., x, y, z) of its location in a number of different ways including by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchors 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
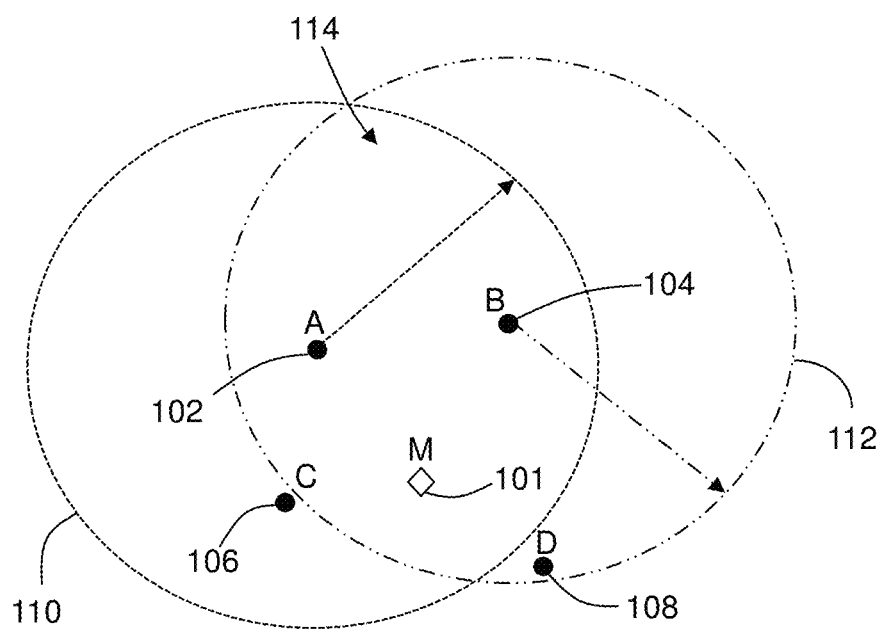
FIGS. 4A, 4B and 4C are block diagrams illustrating exemplary, non-limiting embodiments for selecting pairs of anchors in accordance with various aspects described herein.
Figure 4B:
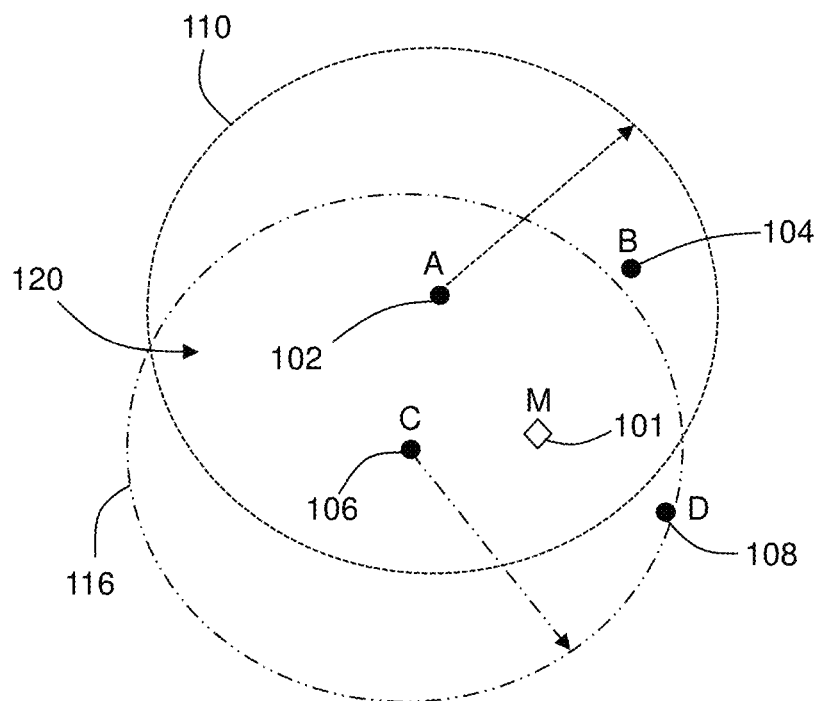

FIG. 4B shows that the coverage areas 110 and 116 of anchor pairs 102, 106 (anchors A/C), respectively, creates an overlapping region 120 that encompasses anchors 102 and 106 and the mobile tag 101, thereby enabling the mobile tag

Figure 4C:
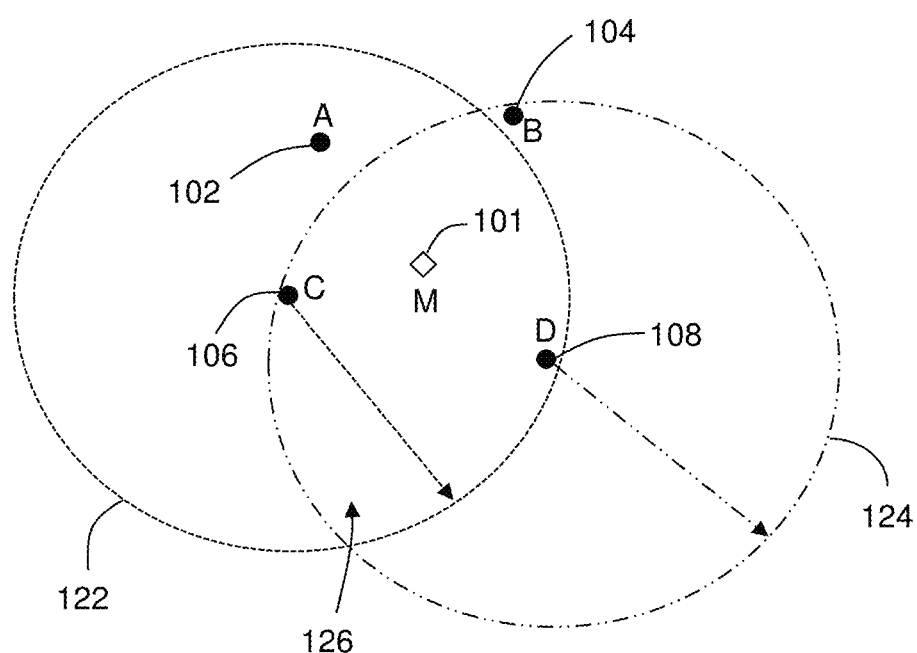

101 to calculate hyperbolic curve $h_{AC}$. Additionally, FIG. 4C shows that the coverage areas 122 and 124 of anchor pairs 106, 108 (anchors C/D), respectively, creates an overlapping region 126 that encompasses anchors 106 and 108 and the mobile tag 101, thereby enabling the mobile tag 101 to calculate hyperbolic curve $h_{CD}$.

Figure 5:
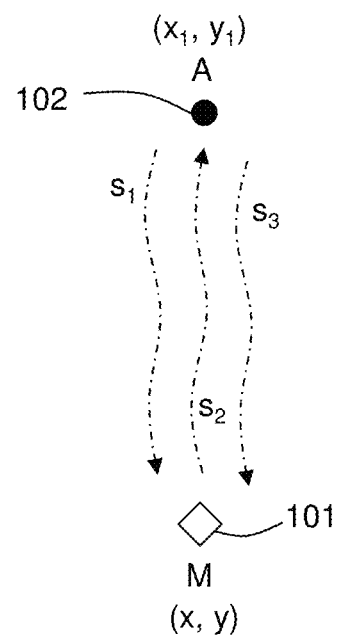
FIG. 5 is a block diagram illustrating an exemplary, non-limiting embodiment of a mobile tag and an anchor for determining location information between the mobile tag and the anchor in accordance with various aspects described herein.
Figure 6:
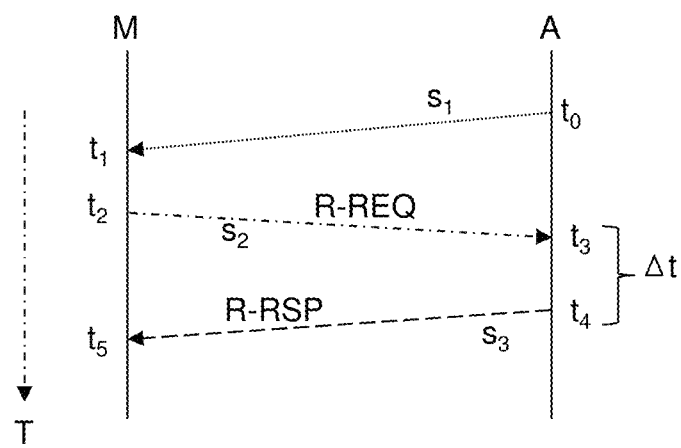
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In one or more embodiments, the devices and functions described with respect to FIG. 5, which can include messaging for performing location determination, can also be utilized in generating an RF fingerprint model(s) for a demarcated area according to RF channel characteristics, calculated locations and/or other collected data so that location determination can be performed according to the RF fingerprint model(s).

In the embodiment of FIG. 5, the mobile tag 101 can be configured to use a two-way time of arrival (TW-TOA) process for determining a distance between itself and the anchor 102. Optionally, the process may begin at anchor 102 which transmits a first wireless signal ($s_1$), which is received at time $t_1$. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t = t_4 - t_3$, which can be communicated to the mobile tag 101 via the third wireless signal ($s_3$).

The mobile tag 101 can be configured to determine a roundtrip distance based on the formula, $$d_{r\text{-}trip} = d_{AM} + d_{MA},$$

where $d_{r\text{-}trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA} = c(t_3 - t_2).$$

Similarly, the distance from anchor 102 to the mobile tag 101 can be determined by, $$d_{AM} = c(t_5 - t_4).$$

With the above equations, the roundtrip distance can be rewritten as, $$d_{r\text{-}trip} = c(t_5 - t_4 + t_3 - t_2).$$

As noted earlier, the time to process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d_{r\text{-}trip} = c(t_5 - t_2 - \Delta t).$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to anchor 102 based on the formula, $$d_{MA} = d_{r\text{-}trip}/2.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or anchors in other embodiments to calculate a relative distance between each other. It will be appreciated that TW-TOA process described above can also between mobile tags 101. That is, anchor 102 shown in FIG. 5 can be replaced with another mobile tag 101. In this embodiment, mobile tags 101 can use TW-TOA to measure a distance between each other.

It will be appreciated that the TDOA and TW-TOA processes described above can also between mobile tags 101. For example, FIGS. 1-3, 4A-4C, and 5-6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
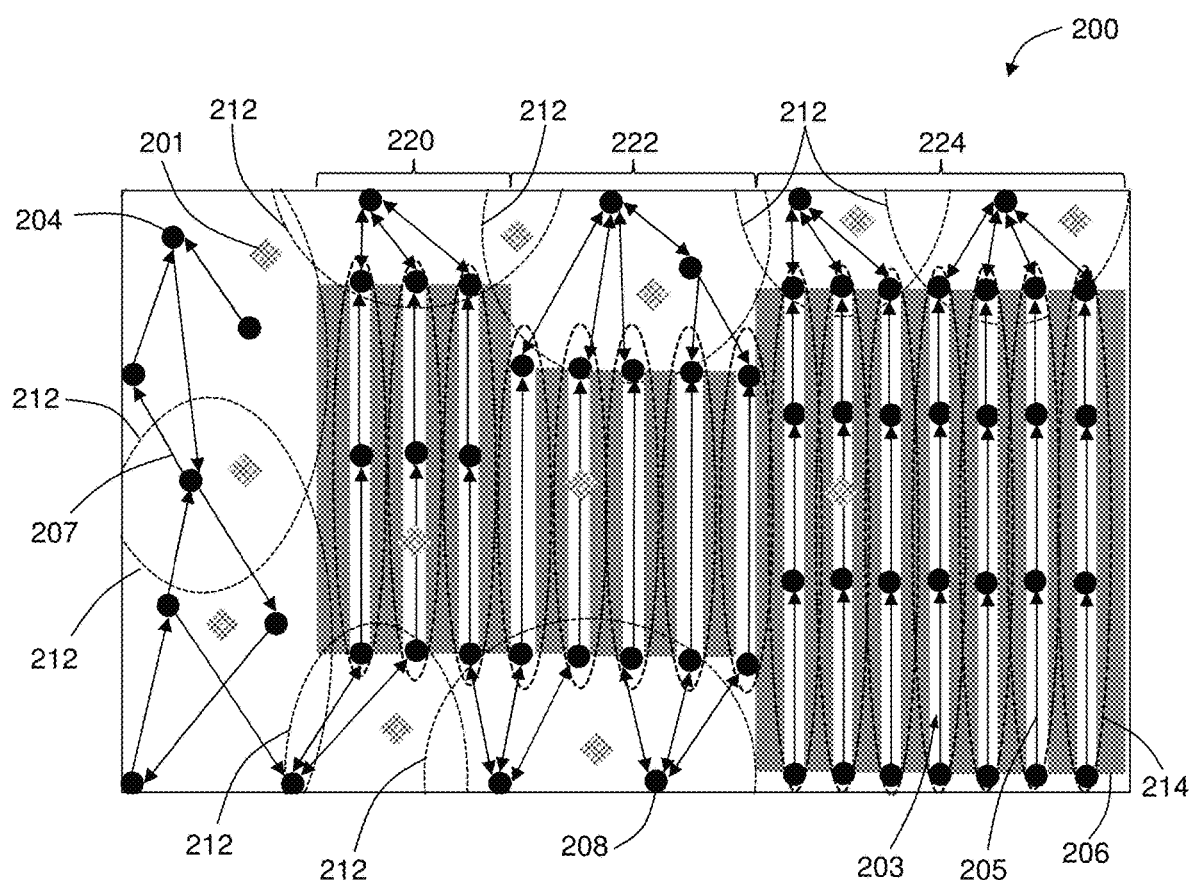
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7. In one or more embodiments, the devices and functions described with respect to FIG. 7, which can include messaging for performing location determination, can also be utilized in generating an RF fingerprint model(s) for a demarcated area according to RF channel characteristics, calculated locations and/or other collected data so that location determination can be performed according to the RF fingerprint model(s).

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications for which the subject disclosure can be applied to. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and line-of-site to pairs of anchors 204), the mobile tag 201 can be configured to perform TDOA measurements among pairs of anchors 204 as described above in relation to FIGS. 1, 2, 3, 4A, 4B, 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
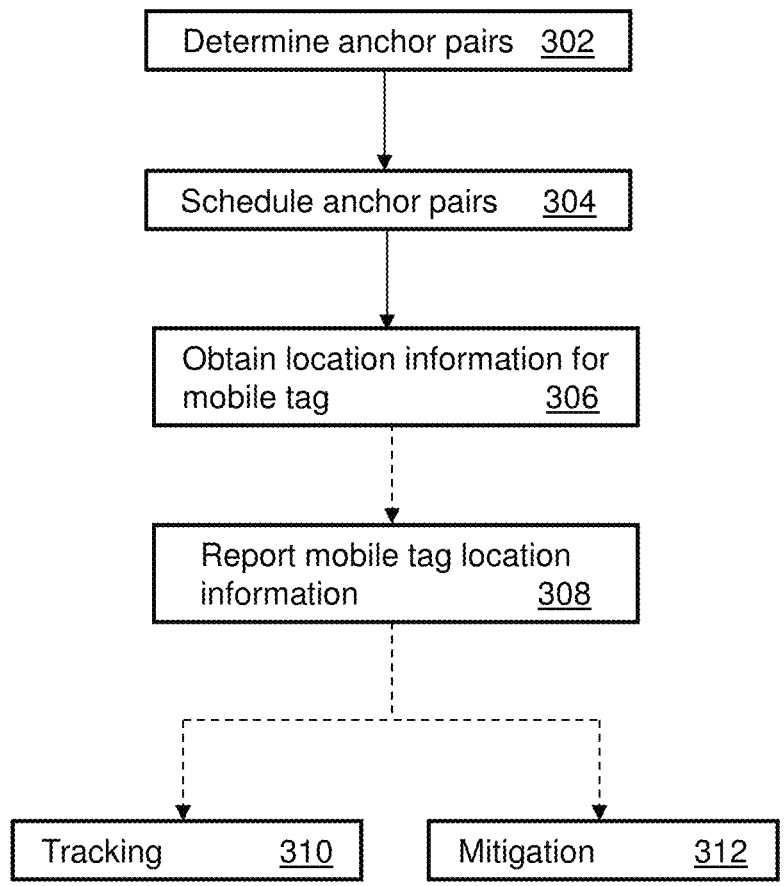
FIG. 8 depicts an illustrative embodiment of a method for determining location information and uses thereof in accordance with various aspects described herein.

FIG. 8 depicts an illustrative embodiment of a method 300 in accordance with various aspects described herein. In one or more embodiments, the devices and functions described with respect to FIG. 8, which can include messaging for performing location determination, can also be utilized in generating an RF fingerprint model(s) for a demarcated area according to RF channel characteristics, calculated locations and/or other collected data so that location determination can be performed according to the RF fingerprint model(s). Method 300 can begin at step 302 where a computing system such as a server (described below in relation to FIG. 11) is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that other techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
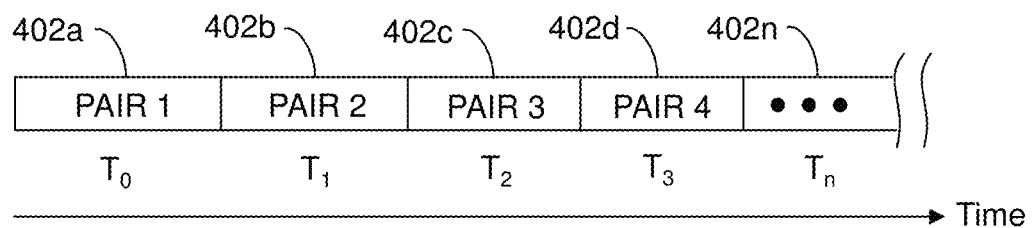
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$–$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 204 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in region 212 (i.e., open spaces) or region 214 (i.e., aisles 203), the source anchors 204 can be configured to transmit in the first wireless signal ($s_1$) an indication whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the lookup-table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, and 5-6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW- TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
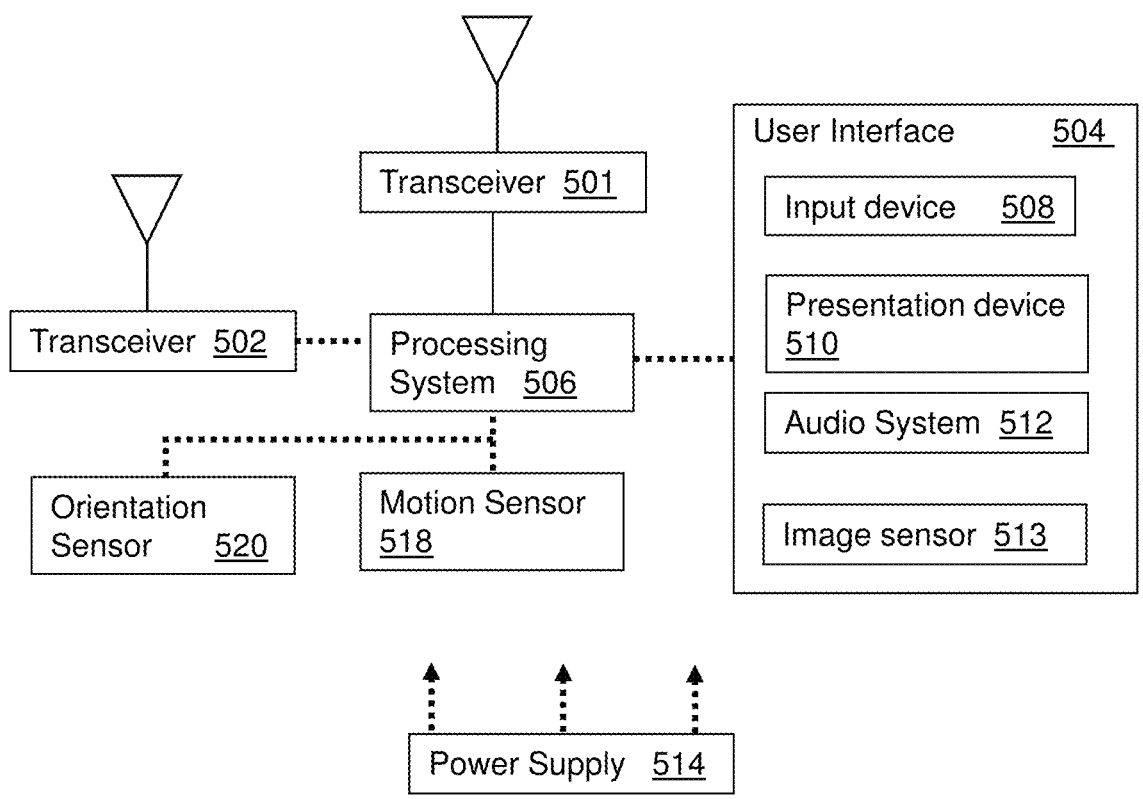
FIG. 10 is a block diagram of an example, non-limiting embodiments of a communication device in accordance with various aspects described herein.

FIG. 10 is a block diagram of an example, non-limiting embodiments of a communication device 500 in accordance with various aspects described herein. Communication device 500 can serve in whole or in part as an illustrative embodiment of a mobile tag 101 and an anchor 102, 104, 106, 108, 204 as depicted in FIGS. 1-7, and can be configured to perform portions of method 300 of FIG. 8. In one or more embodiments, the devices and functions described with respect to FIG. 10, which can include messaging for performing location determination, can also be utilized in generating an RF fingerprint model(s) for a demarcated area according to RF channel characteristics, calculated locations and/or other collected data so that location determination can be performed according to the RF fingerprint model(s).

In an embodiment, communication device 500 can comprise a first wireless transceivers 501, a user interface (UI) 504, a power supply 514, and a processing system 506 for managing operations of the communication device 500. In another embodiment, communication device 500 can further include a second wireless transceiver 502, a motion sensor 518, and an orientation sensor 520. The first wireless transceiver 501 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 502 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 502 can be utilized to conserve power and offload messaging between communication devices by utilizing narrow band signals such as Bluetooth®, ZigBee®, or WiFi, instead of ultra-wideband signals. One or both wireless transceivers 501, 502 can also be used for obtaining a strength indicator (RSSI). One or both wireless transceivers 501, 502 can also be equipped with multiple antennas and one or more phase detectors to determine angle of arrival of wireless signals and thereby an orientation of the communication device 500 (e.g., mobile tag 101) relative to another communication device 500 (e.g., anchor 204).

The UI 504 can include an input device 508 that provides at least one of one or more depressible buttons, a tactile keypad, a touch-sensitive keypad, or a navigation mechanism such as a roller ball, a joystick, or a navigation disk for manipulating operations of the communication device 500. The input device 508 can be an integral part of a housing assembly of the communication device 500 or an independent device operably coupled thereto by a tethered wireline interface (such as a USB cable) or a wireless interface supporting for example Bluetooth®. The UI 504 can further include a presentation device 510. The presentation device 510 can include a vibrator to generate haptic feedback, an LED (Light Emitting Diode) configurable by the processing system 506 to emit one or more colors, and/or a monochrome or color LCD (Liquid Crystal Display) or OLED (Organic LED) display configurable by the processing system to present alphanumeric characters, icons or other displayable objects.

The UI 504 can also include an audio system 512 that utilizes audio technology for conveying low volume audio (for proximity listening by a user) and/or high volume audio (for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images in a vicinity of the communication device 500. The camera can be used for performing facial recognition and user ID recognition that can be combined with embodiments of the subject disclosure.

The power supply 514 can utilize common power management technologies such as replaceable and rechargeable batteries, supply regulation technologies, and/or charging system technologies for supplying energy to the components of the communication device 500 to facilitate portable applications. Alternatively, or in combination, the charging system can utilize external power sources such as DC power supplied over a physical interface such as a USB port or other suitable tethering technologies.

The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (in degrees, minutes, or other suitable orientation metrics). In some embodiments, the orientation sensor 520 can replace a need for utilizing multiple antennas with the first and/or second wireless transceivers 501, 502 and a phase detector for performing angle of arrival measurements. In other embodiments, the function of the orientation sensor 520 can be combined with an angle of arrival measurement performed with multiple antennas with the first and/or second wireless transceivers 501, 502 and a phase detector.

The processing system 506 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 10 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings.

The communication device 500 as described herein can operate with more or less of the circuit components shown in FIG. 10. These variant embodiments can be used in one or more embodiments of the subject disclosure.

Figure 11:
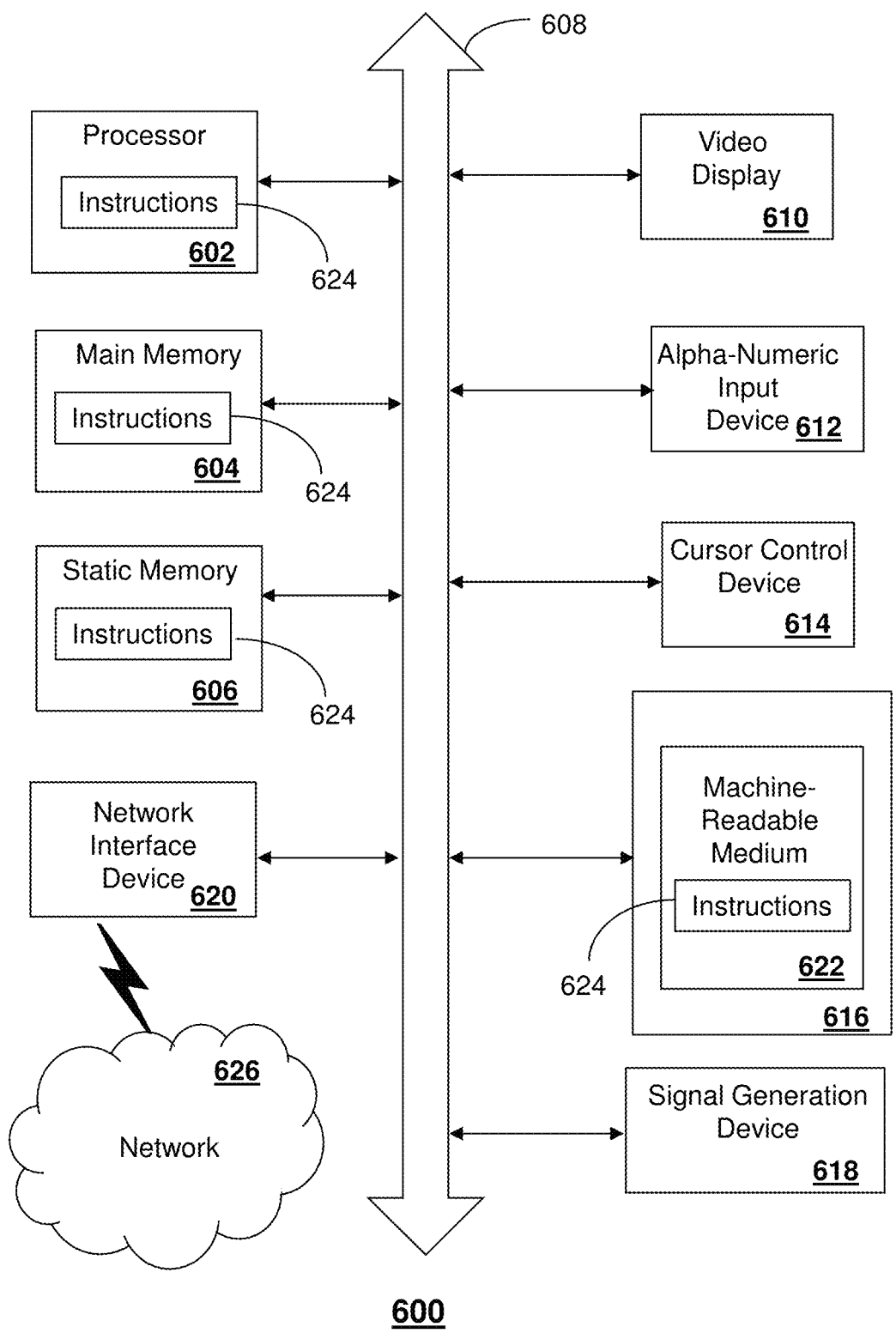
FIG. 11 is a block diagram of an example, non-limiting embodiments of a computing system in accordance with various aspects described herein.

FIG. 11 depicts an exemplary diagrammatic representation of a machine in the form of a computing system 600 within which a set of instructions, when executed, may cause the machine to perform any one or more of the methods described above. One or more instances of the machine can operate, for example, as the computing system referred to in method 300 of FIG. 8. In one or more embodiments, the components and functions described with respect to FIG. 11, which can include messaging for performing location determination, can also be utilized in generating an RF fingerprint model(s) for a demarcated area according to RF channel characteristics, calculated locations and/or other collected data so that location determination can be performed according to the RF fingerprint model(s). In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

In one or more embodiments, an RF fingerprint(s) (e.g., RF signature(s)) can be generated that describes, or is otherwise indicative of, one or more RF channel characteristics for positions or zones within a particular area (e.g., factory, storage facility, outdoor venue, indoor venue, or other areas where location determinations can be employed), such as a demarcated area associated with a plurality of anchors. The RF fingerprint can be an RF fingerprint model generated from machine learning according to observed RF characteristics of RF channels for various mobile devices or objects at various positions (or various zones) within the particular area. In other embodiments, the RF fingerprint can be an RF fingerprint mapping generated by various techniques (which may or may not include machine learning) according to observed RF characteristics of RF channels for various mobile devices or objects at various positions or zones within the particular area. As explained herein, the RF fingerprint model can be based on one or multiple RF characteristics of the channels at various locations. The RF fingerprint can also be based on other data for the various locations, such as instantaneous radio measurements. For any unique location within the area, there is a vector of values representing the RF characteristics (or combination of different RF characteristics such as Receiving Signal Strength (RSS) and Channel Impulse Response (CIR) of the channel between the object and the particular anchors. Each location in the area can have a unique and different RF fingerprint or signature. In one embodiment, if there are nine anchors and an object at location X (or within a zone A) receives and/or transmits messages with all nine anchors, then the RF fingerprint at location X (or within a zone A) can be (obj_type, RF_cha1, RF_cha2, . . . , RF_cha9) where a single RF characteristic (e.g., RSS or CIR) is being collected. Any number of anchors can be utilized, and, depending on the location in the area, not all messages from anchors may be obtained.

In one or more embodiments, information can be collected from a real time location system (by one or more devices that are part of and/or distinct from the real time location system), where the real time location system determines device or object positions based on instantaneous radio measurements from, or otherwise associated with, the radio object. The real time location system can manage one or more radio or range measurement locating processes, such as described with respect to FIGS. 1-11. These described radio or range measurement locating processes and devices (or functions or components thereof) can be utilized (in whole or in part) in conjunction with one or more of the embodiments described herein and/or in place of one or more functions or components described with respect to the one or more of the embodiments.

The collected information can include RF channel characteristic(s) (e.g., RSS, CIR, and so forth) for messages that are wirelessly communicated within the real time location system in conjunction with location determinations for the mobile devices or objects. For example, the wireless messages can be range requests and/or range responses (e.g., transmitted from mobile device(s) to anchor(s), transmitted from anchor(s) to mobile device(s), and/or transmitted from anchor(s) to anchor(s)) that are utilized by the real time location system to obtain instantaneous radio measurements. In another embodiment, the messages that are being analyzed to identify the RF channel characteristics for a particular location can be other types of messages (e.g., transmitted from mobile device(s) to anchor(s), transmitted from anchor(s) to mobile device(s), and/or transmitted from anchor(s) to anchor(s)) other than range requests and/or range responses. In another embodiment, the messages that are being analyzed to identify the RF channel characteristics for a particular location can be a combination of range requests, range responses and/or other types of messages (e.g., transmitted from mobile device(s) to anchor(s), transmitted from anchor(s) to mobile device(s), and/or transmitted from anchor(s) to anchor(s)).

The collected information can also include the radio measurements (e.g., range measurements) which are being used by the real time location system to calculate object locations by way of various geometric position methods (e.g., TDOA, TOA, and so forth) or other radio measurement locating processes.

For example, radio or range measurement locating processes and devices that are utilized in such processes are described with respect to U.S. Pat. No. 10,408,917 filed Jan. 11, 2019; U.S. Pat. No. 10,444,321 filed Dec. 31, 2014; and U.S. Patent Application Publication 2015/0156746 filed Dec. 3, 2014, the disclosures of all of which are incorporated by reference herein in their entirety. These described radio or range measurement locating processes and devices (or functions or components thereof) can be utilized (in whole or in part) in conjunction with one or more of the embodiments described herein and/or in place of one or more functions or components described with respect to the one or more of the embodiments.

In one embodiment, the collected RF channel characteristics and the calculated device or object location based on instantaneous measurements can form a labeled data sample, such as (obj_type, RF_cha1, RF_cha2, . . . , RF_chaK) <=>calculated position (x, y, z), where the calculated position is the label of the RF data. For example, the labeled data set can correspond to the anchors that are servicing the particular area and the RF channels representing wireless transmissions to or from the anchors and/or to or from the mobile devices at particular device locations. In another embodiment, the radio measurements can also be utilized as a data sample in the RF fingerprint, such as (obj_type, RM1, RM2, RMm, RF_cha1, RF_cha2, . . . , RF_chaK)<=>calculated position (x, y, z). In another embodiment, multiple RF characteristics can form the data sample, such as utilizing both RSS and CIR for each of the locations. In this example, the data sample may or may not include other data, such as the instantaneous radio measurements for the location.

In one or more embodiments, when a sufficient number of labeled data samples are collected, they can form a training set to train a machine learning model which can learn the RF fingerprint or signature of the environment from the data. The trained RF fingerprint model can be utilized to identify a position or zone when RF characteristics for communications associated with a mobile device or object in the demarcated area are received. In one or more embodiments, the trained RF fingerprint model can be used to generate new positions when new RF data is available. In one or more embodiments, the trained RF fingerprint model can be used to improve position accuracy determinations, such as by allowing for a comparison of position determinations from a radio measurement technique as compared to position determinations from the RF fingerprint model. In one or more embodiments, the trained RF fingerprint model can provide a position determination when there are no sufficient instantaneous radio measurements for a mobile device or object that would allow for a position calculation by a radio or range measurement technique.

In one or more embodiments, the RF characteristics for the messages being communicated during the radio measurement locating processes (e.g., geometric position methods such as TDOA, TOA, and so forth) can be collected (along with the calculated position of the mobile device) so that a site survey for RF channel characteristics of the entire area does not need to be performed. In another embodiment, a site survey (of the entire area or portion(s) thereof) for RF channel characteristics can be performed and the survey RF data can be utilized in conjunction with other collected data (e.g., the RF channel characteristics collected from the messages) or other functions described herein. For example, the survey RF data can be compared to the RF channel characteristics collected from the messages to evaluate accuracy. In another example, differences in the RF survey data and the RF channel characteristics collected from the messages can be monitored to determine potential changes to the area (e.g., a change in area layout (such as a shelf being added, removed or moved), an anchor adjustment (such as an anchor being added, removed or moved), and so forth).

In one or more embodiments, for some metrics (e.g., zones) other than actual mobile device or object position, the collected labeled data samples can be (obj_type, RF_cha1, RF_cha2, . . . , RF_chaK)<=>position label, where the position label is the interested metric (e.g., zone) derived from the calculated position. When a sufficient number of labeled data samples are collected, they will form a training set to train a machine learning model which can learn the environment and predict the interested metric (e.g., zone) when new RF data is available. In this example, the use of zones allows for less resolution in determining positions.

One or more embodiments can utilize various machine learning based on the training data described herein. As an example, the RF data being collected characterizes the channel condition of the RF signal path between the mobile device or object and each one of the plurality of anchors (which are available for communication). The machine learning also allows the radio or range measurement calculations (e.g., TDOA, TOA, and so forth) to be combined with the RF data as an extended feature set for the learning model. For instance, if the label is the calculated position (e.g., from TDOA, TOA, and so forth), the learning problem can be a regression problem. If the label is a class metric, such as a zone label (e.g., mapped from the calculated position from TDOA, TOA, and so forth), the learning problem can be a classification problem. Various machine learning algorithms can be utilized for regression or classification, and can be used in building the machine learning model, such as one or any combination of support vector machines, neural networks, K-nearest neighbors, gradient boosting, and so forth.

As described herein, various radio measurement locating processes and combinations of processes (e.g., geometric position methods such as TDOA, TOA, and/or so forth) can be utilized which facilitate the generating of the RF fingerprint model. The radio measurement locating processes can also be in the uplink and/or downlink.

In one embodiment where the radio measurement locating process is in the uplink, the machine learning based method described herein can collect the RF characteristic data (for mobile device or object locations) at the anchors. Continuing with this uplink example, analysis and computation of the training data can be done at a server in communication with all or some of the anchors (e.g., each anchor can directly send the data samples to the server and/or particular anchor(s) can send the data samples to other anchor(s) which can then directly send the data samples to the server). The server can have the computation power required for running a more complicated machine learning algorithm and more storage space for more data samples to be used in training the model, as compared to one of the mobile devices. In one embodiment, there can be more data samples available in uplink cases as compared to downlink cases as the data from different mobile device or objects are collected and used for model training. For example in one embodiment, if there are 1000 mobile devices or objects in the network, 1000 data samples could be collected in a round of positioning in an uplink case. The collection of more data can facilitate generating a more accurate RF fingerprint model from training. This example in the uplink can also provide for less complexity and power consumption within the network (e.g., by anchors and/or by mobile device or objects). For example, in one embodiment in the uplink, only one model may be maintained (or only one model for each type of mobile device or object (e.g., mobile personal tag, forklift radio, mobile phone, and so forth). In other embodiments, one model per mobile device or object may be maintained. In one embodiment, one model per mobile device or object may be maintained in downlink cases. As described herein, any number of models can be maintained and they can be stored at a single device or multiple devices.

Figure 12:
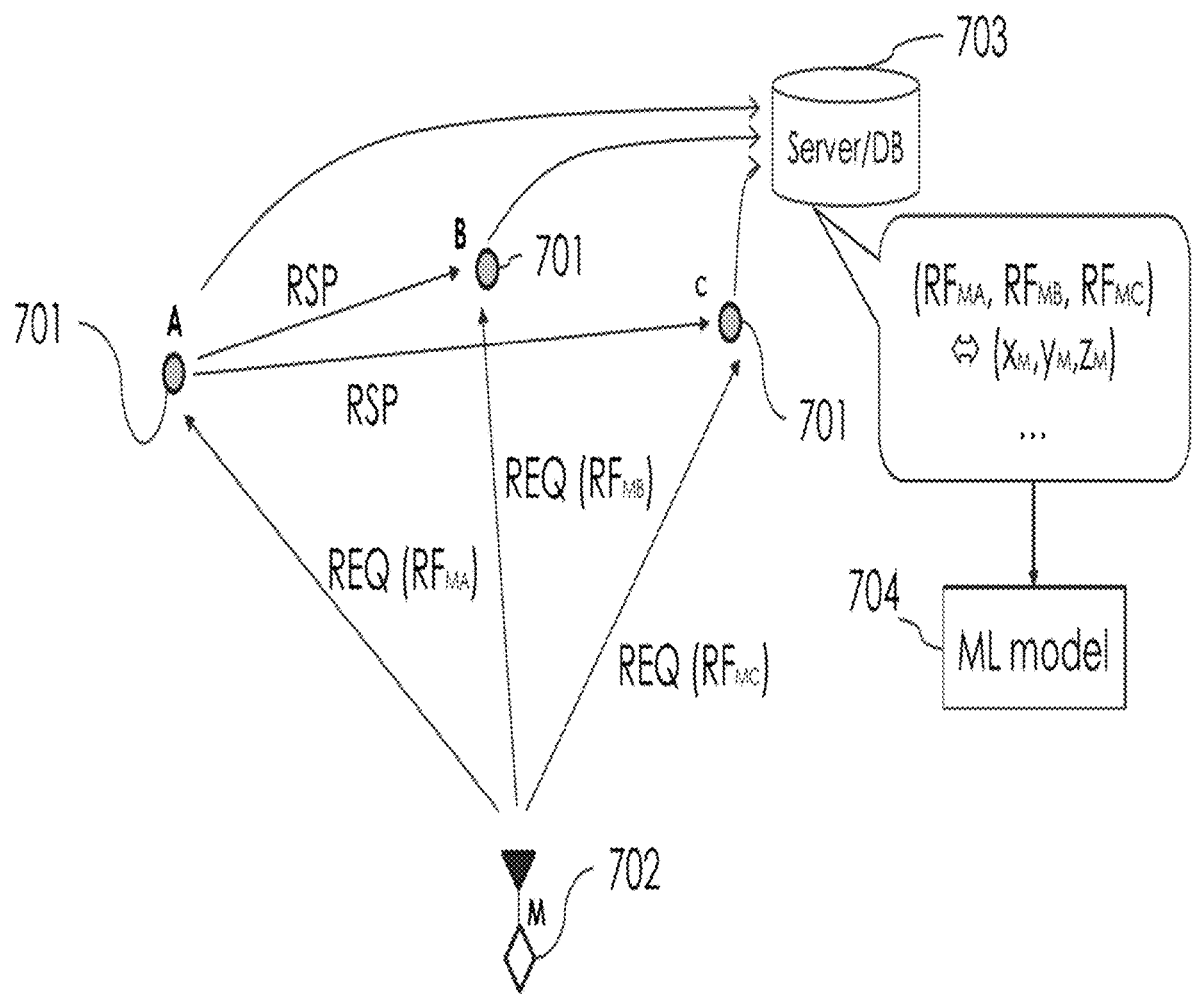
FIGS. 12-27 are block diagrams illustrating exemplary, non-limiting embodiments for determining location information for mobile devices in a demarcated area utilizing RF (Radio Frequency) channel characteristics in accordance with various aspects described herein.

FIG. 12 is a block diagram of a portion of a system 700 illustrating an exemplary, non-limiting embodiment of a mobile device 702 (labeled "M") and stationary anchors 701 (anchors labeled "A", "B", "C") for determining location information between the mobile device 702 and the stationary anchors 701 in accordance with various aspects described herein. System 700 shows three anchors 701 that facilitate determining the position of mobile device 702, although any number of anchors in various configurations and layouts can be utilized, such as shown in FIG. 7. In one embodiment, more than three anchors can be utilized in order to provide a more robust RF fingerprint for device or object locations in a demarcated area that is serviced by the more than three anchors. The anchors 701 can be various types of stationary devices that are capable of wireless communication and whose position information is known (e.g., x-y coordinates and the distance between anchors). The anchors 701 can be one or more of the anchors as described herein with respect to FIGS. 1-11. System 700 shows one mobile device or object 702, although any number of mobile devices can be utilized, such as shown in FIG. 7. The mobile device 702 can be various types of mobile devices that are capable of wireless communication, such as a mobile tag, mobile phone, equipment radio, vehicle radio, and so forth. The mobile device 702 can be one or more of the mobile tags or mobile objects as described herein with respect to FIGS. 1-11.

System 700 utilizes uplink TDOA as a radio measurement locating process for determining mobile device locations within a demarcated area. In one embodiment, as the uplink TDOA process is repeated for the same mobile device 702 or other mobile devices, position learning can be employed based on RF channel characteristics of messages utilized during the uplink TDOA processes. For example, the anchors 701 can collect RF characteristics $RF_{MA}$, $RF_{MB}$, $RF_{MC}$ from received REQ messages from the mobile device 702. As described herein, the REQ messages and the RSP messages are utilized by system 700 to perform the uplink TDOA process for calculating the location of the mobile device 702. The anchors 701 can transmit the data samples, which include the RF channel characteristics corresponding to the particular location, to a server 703. The RF characteristics can be various types or combinations such as RSS and/or CIR. In one embodiment, the server 703 can utilize the radio measurements that are generated as a result of communication of the REQ messages and the RSP messages to perform the uplink TDOA calculation which calculates a location of the mobile device 702.

As the mobile device 702 (or other mobile devices) traverses the demarcated area and as the uplink TDOA process is repeated to calculate various positions within the demarcated area, the server 703 can form a training set from the RF channel characteristics and the corresponding calculated locations. The server 703 can then train a machine learning model(s) 704 which can learn an RF fingerprint of the demarcated area. Various machine learning algorithms can be utilized in building the machine learning model 704, such as support vector machines, neural networks, K-nearest neighbors, gradient boosting, other regression analysis, and so forth. In one embodiment, only one RF fingerprint model 704 is maintained for the demarcated area. In another embodiment, only one RF fingerprint model 704 for each type of mobile device or object (e.g., mobile personal tag, forklift radio, and so forth) is maintained for the demarcated area. In another embodiment, one RF fingerprint model 704 per mobile device or object is maintained for the demarcated area.

Once the RF fingerprint model 704 is generated, new RF channel characteristics that are determined for the mobile device 702 (from the new REQ messages received by the anchors 701 as described above) can then be utilized in conjunction with the RF fingerprint model 704 to determine a location of the mobile device 702. In one embodiment, the location determined from the RF fingerprint model 704 (e.g., RF-based location) can be compared with the location calculated from the new REQ messages via the uplink TDOA process (e.g., range measurement (RM)-based location by the server 703) to determine accuracy of the location determinations. In another embodiment, the comparison of the RF-based location and the RM-based location can be utilized for providing accuracy scores for one or both of the RF-based location determination and the RM-based location calculation. In one embodiment, there may not be sufficient radio measurement data to perform the uplink TDOA calculation or the RM-based location may be deemed faulty, in which case the RF-based location calculation may be the only location calculation utilized in this instance. In one embodiment, the RF fingerprint model 704 can be adjusted according to subsequent location determinations, such as increasing the resolution of the location determinations via the RF fingerprint model by providing a more robust training data set.

Figure 13:
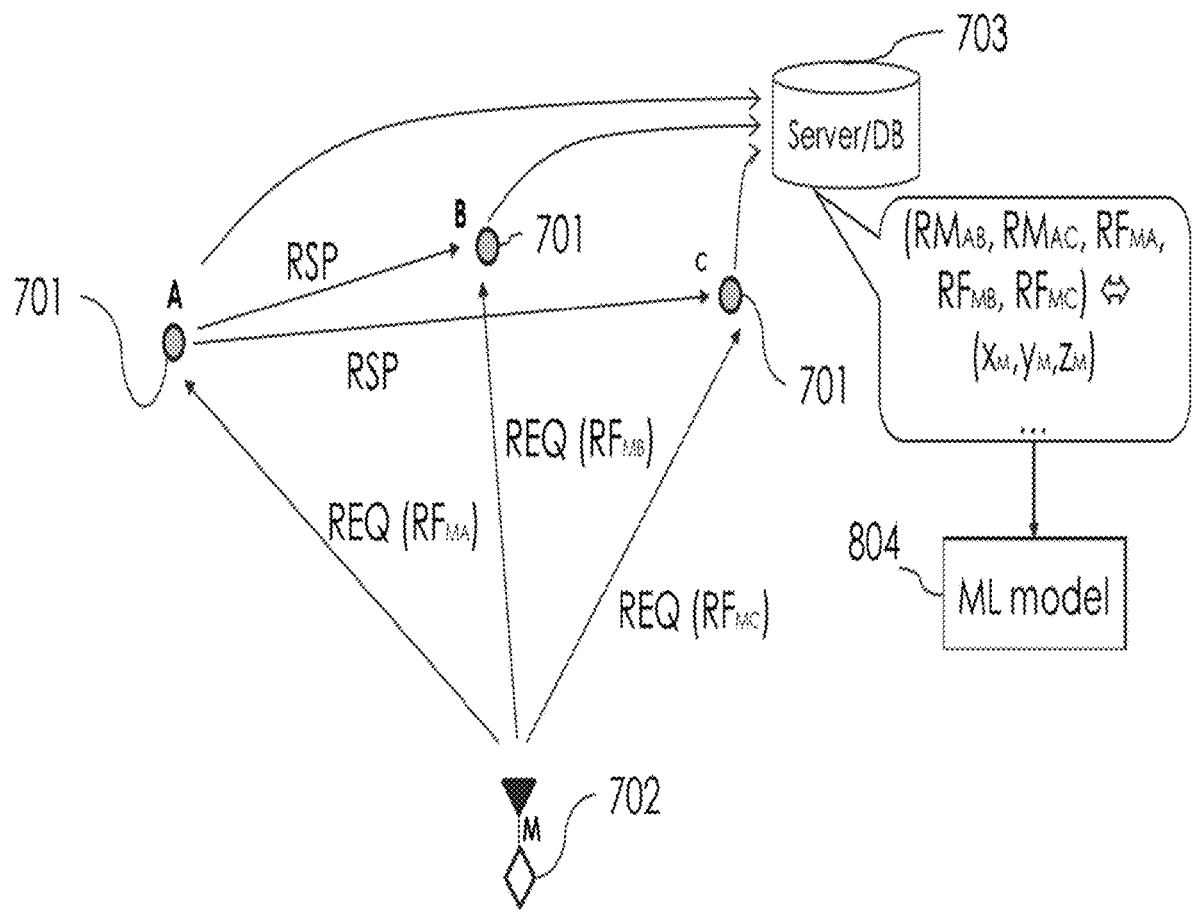

FIG. 13 is a block diagram of a portion of a system 800 illustrating an exemplary, non-limiting embodiment of the mobile device 702 and the stationary anchors 701 in accordance with various aspects described herein. System 800 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 700 shows one mobile device or object 702, although any number of mobile devices can be utilized, such as shown in FIG. 7. The mobile device 702 can be similar to those as described in system 700 of FIG. 12 or as described with respect to other embodiments herein.

System 800 utilizes uplink TDOA as a radio measurement locating process for determining mobile device locations within a demarcated area but expands the data set to include the radio measurements. In one embodiment, as the uplink TDOA process is repeated for the same mobile device 702 or other mobile devices, position learning can be employed based on the radio measurements and the RF channel characteristics of messages utilized during the uplink TDOA processes. For example, the anchors 701 can collect RF characteristics $RF_{MA}$, $RF_{MB}$, $RF_{MC}$ from received REQ messages from the mobile device 702. As described herein, the REQ messages and the RSP messages are utilized by system 700 to perform the uplink TDOA process for calculating the location of the mobile device 702. The anchors 701 can transmit the data samples, which include the RF channel characteristics corresponding to the particular location and the radio measurements $RM_{AB}$, $RM_{AC}$ of anchor pairs that are utilized by the uplink TDOA calculation, to the server 703. The RF characteristics can be various types or combinations such as RSS and/or CIR. In one embodiment, the server 703 can utilize the radio measurements that are generated as a result of communication of the REQ messages and the RSP messages to perform the uplink TDOA calculation which determines a location of the mobile device 702.

As the mobile device 702 (or other mobile devices) traverses the demarcated area and as the uplink TDOA process is repeated to calculate various positions within the demarcated area, the server 703 can form a training set from the RF channel characteristics, the radio measurements and the corresponding calculated locations. The server 703 can then train a machine learning model(s) 804 which can learn an RF fingerprint of the demarcated area. Various machine learning algorithms can be utilized as described with respect to system 700 of FIG. 12. A single RF fingerprint model 804 for all mobile devices, one RF fingerprint model 804 for each type of mobile device, and/or a unique RF fingerprint model 804 for each mobile device can be maintained for the demarcated area.

Once the RF fingerprint model 804 is generated, new RF channel characteristics and radio measurements that are determined for the mobile device 702 (from the new REQ messages received by the anchors 701 as described above) can then be utilized in conjunction with the RF fingerprint model 804 to determine a location of the mobile device 702. In one embodiment, the location determined from the RF fingerprint model 804 (e.g., RF-based location) can be compared with the location calculated from the new REQ messages via the uplink TDOA process (e.g., RM-based location by the server 703) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the uplink TDOA calculation or the RM-based location may be deemed faulty, in which case the RF-based location calculation may be the only location calculation utilized in this instance. In one embodiment, the RF fingerprint model 804 can be adjusted according to subsequent location determinations, such as increasing the resolution of the location determinations via the RF fingerprint model by providing a more robust training data set.

Figure 14:
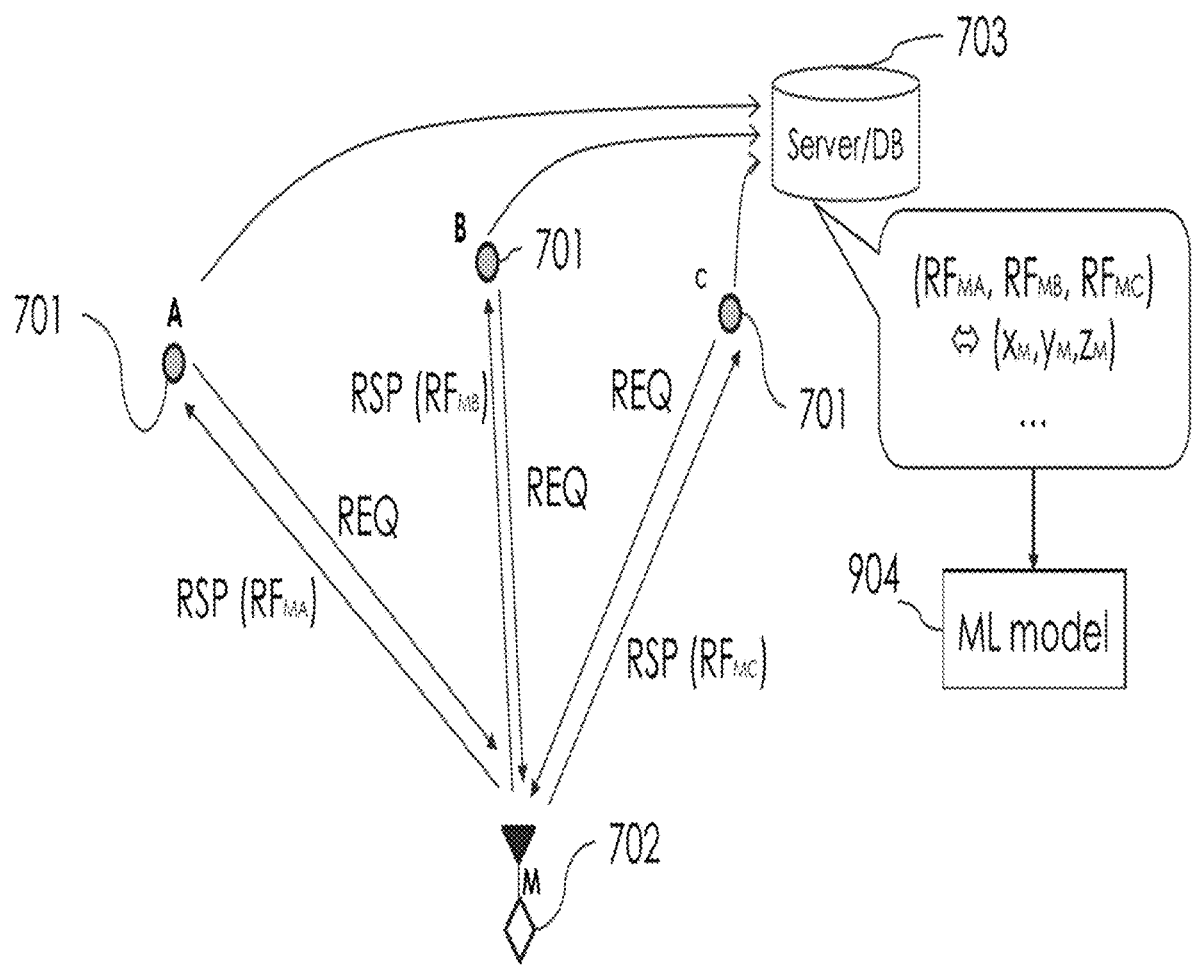

FIG. 14 is a block diagram of a portion of a system 900 illustrating an exemplary, non-limiting embodiment of the mobile device 702 and the stationary anchors 701 in accordance with various aspects described herein. System 900 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 900 shows one mobile device or object 702, although any number of mobile devices can be utilized, such as shown in FIG. 7. The mobile device 702 can be similar to those as described in system 700 of FIG. 12 or as described with respect to other embodiments herein.

System 900 utilizes uplink TW-TOA as a radio measurement locating process for determining mobile device locations within a demarcated area. In one embodiment, as the uplink TW-TOA process is repeated for the same mobile device 702 or other mobile devices, position learning can be employed based on RF channel characteristics of messages utilized during the uplink TW-TOA processes. For example, the anchors 701 can collect RF characteristics $RF_{MA}$, $RF_{MB}$, $RF_{MC}$ from received RSP messages from the mobile device 702. As described herein, the REQ messages and the RSP messages are utilized by system 900 to perform the uplink TW-TOA process for calculating the location of the mobile device 702. The anchors 701 can transmit the data samples, which include the RF channel characteristics corresponding to the particular location, to the server 703. The RF characteristics can be various types or combinations such as RSS and/or CIR. In one embodiment, the server 703 can utilize the radio measurements that are generated as a result of communication of the REQ messages and the RSP messages to perform the uplink TW-TOA calculation which calculates a location of the mobile device 702.

As the mobile device 702 (or other mobile devices) traverses the demarcated area and as the uplink TW-TOA process is repeated to calculate various positions within the demarcated area, the server 703 can form a training set from the RF channel characteristics and the corresponding calculated locations. The server 703 can then train a machine learning model(s) 904 which can learn an RF fingerprint of the demarcated area. Various machine learning algorithms can be utilized as described with respect to system 700 of FIG. 12. A single RF fingerprint model 904 for all mobile devices, one RF fingerprint model 904 for each type of mobile device, and/or a unique RF fingerprint model 904 for each mobile device can be maintained for the demarcated area.

Once the RF fingerprint model 904 is generated, new RF channel characteristics that are determined for the mobile device 702 (from the new RSP messages received by the anchors 701 as described above) can then be utilized in conjunction with the RF fingerprint model 904 to determine a location of the mobile device 702. In one embodiment, the location determined from the RF fingerprint model 904 (e.g., RF-based location) can be compared with the location calculated from the new RSP messages via the uplink TW-TOA process (e.g., RM-based location by the server 703) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the uplink TW-TOA calculation or the RM-based location may be deemed faulty, in which case the RF-based location calculation may be the only location calculation utilized in this instance. In one embodiment, the RF fingerprint model 904 can be adjusted according to subsequent location determinations, such as increasing the resolution of the location determinations via the RF fingerprint model by providing a more robust training data set.

Figure 15:
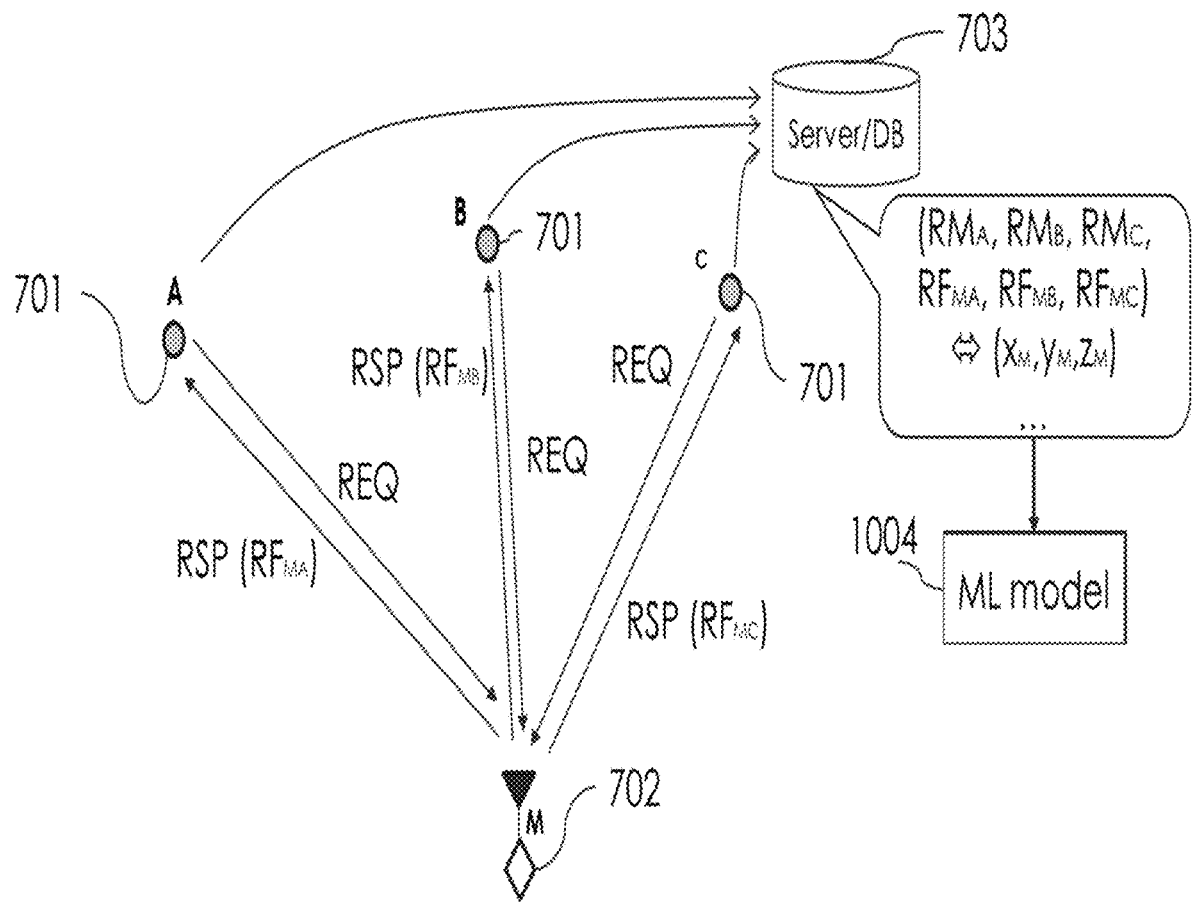

FIG. 15 is a block diagram of a portion of a system 1000 illustrating an exemplary, non-limiting embodiment of the mobile device 702 and the stationary anchors 701 in accordance with various aspects described herein. System 1000 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 1000 shows one mobile device or object 702, although any number of mobile devices can be utilized, such as shown in FIG. 7. The mobile device 702 can be similar to those as described in system 700 of FIG. 12 or as described with respect to other embodiments herein.

System 1000 utilizes uplink TW-TOA as a radio measurement locating process for determining mobile device locations within a demarcated area but expands the data set to include the radio measurements. In one embodiment, as the uplink TW-TOA process is repeated for the same mobile device 702 or other mobile devices, position learning can be employed based on the radio measurements and the RF channel characteristics of messages utilized during the uplink TW-TOA processes. For example, the anchors 701 can collect RF characteristics $RF_{MA}$, $RF_{MB}$, $RF_{MC}$ from received RSP messages from the mobile device 702. As described herein, the REQ messages and the RSP messages are utilized by system 1000 to perform the uplink TW-TOA process for calculating the location of the mobile device 702. The anchors 701 can transmit the data samples, which include the RF channel characteristics corresponding to the particular location and the radio measurements $RM_A$, $RM_B$, $RM_C$ that are utilized by the uplink TW-TOA calculation, to the server 703. The RF characteristics can be various types or combinations such as RSS and/or CIR. In one embodiment, the server 703 can utilize the radio measurements that are generated as a result of communication of the REQ messages and the RSP messages to perform the uplink TW-TOA calculation which determines a location of the mobile device 702.

As the mobile device 702 (or other mobile devices) traverses the demarcated area and as the uplink TW-TOA process is repeated to calculate various positions within the demarcated area, the server 703 can form a training set from the RF channel characteristics, the radio measurements and the corresponding calculated locations. The server 703 can then train a machine learning model(s) 804 which can learn an RF fingerprint of the demarcated area. Various machine learning algorithms can be utilized as described with respect to system 700 of FIG. 12. A single RF fingerprint model 1004 for all mobile devices, one RF fingerprint model 1004 for each type of mobile device, and/or a unique RF fingerprint model 1004 for each mobile device can be maintained for the demarcated area.

Once the RF fingerprint model 1004 is generated, new RF channel characteristics and radio measurements that are determined for the mobile device 702 (from the new RSP messages received by the anchors 701 as described above) can then be utilized in conjunction with the RF fingerprint model 1004 to determine a location of the mobile device 702. In one embodiment, the location determined from the RF fingerprint model 1004 (e.g., RF-based location) can be compared with the location calculated from the new RSP messages via the uplink TW-TOA process (e.g., RM-based location by the server 703) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the uplink TW-TOA calculation or the RM-based location may be deemed faulty, in which case the RF-based location calculation may be the only location calculation utilized in this instance. In one embodiment, the RF fingerprint model 1004 can be adjusted according to subsequent location determinations, such as increasing the resolution of the location determinations via the RF fingerprint model by providing a more robust training data set.

Figure 16:
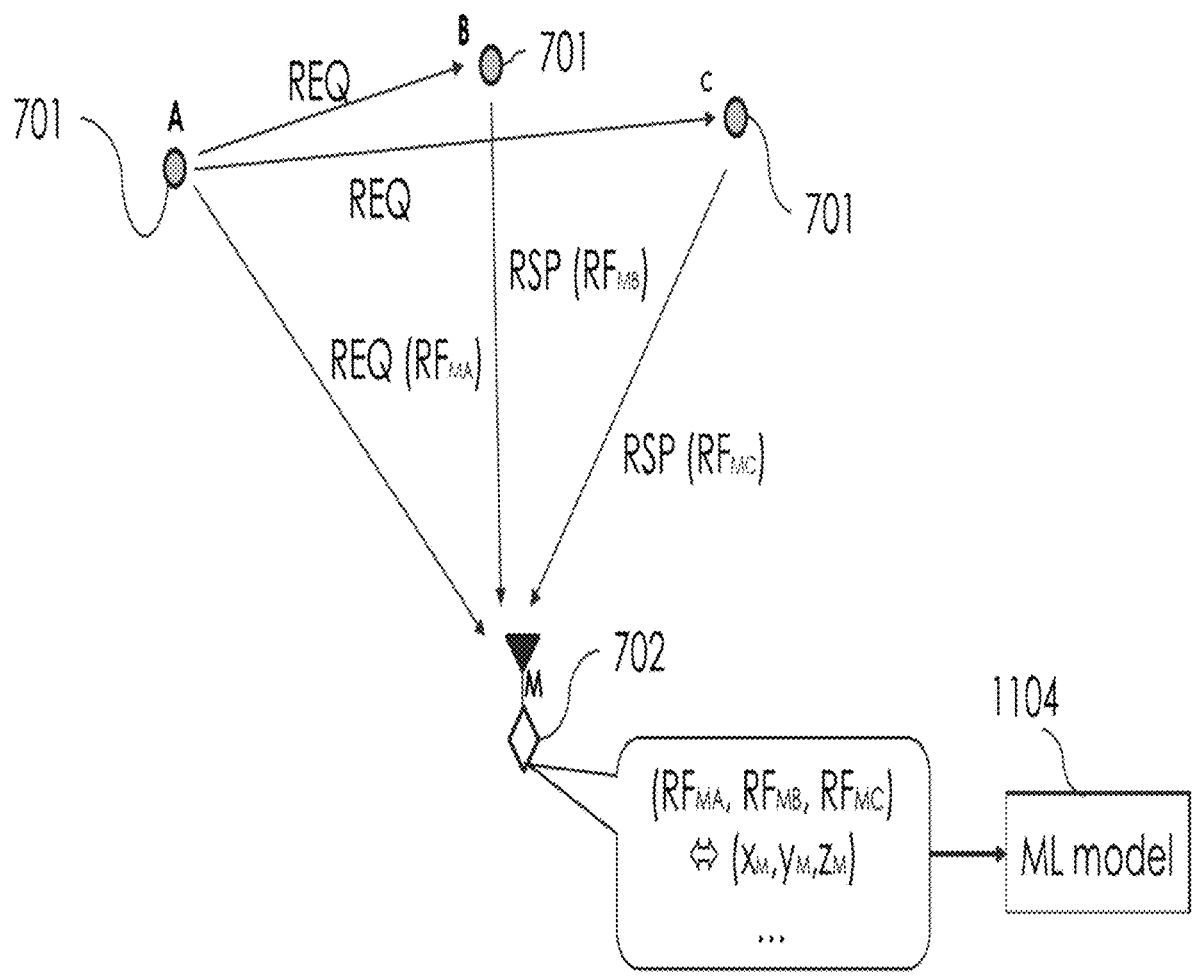

FIG. 16 is a block diagram of a portion of a system 1100 illustrating an exemplary, non-limiting embodiment of the mobile device 702 and the stationary anchors 701 in accordance with various aspects described herein. System 1100 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 1100 shows one mobile device or object 702, although any number of mobile devices can be utilized, such as shown in FIG. 7. The mobile device 702 can be similar to those as described in system 1100 of FIG. 12 or as described with respect to other embodiments herein.

System 1100 utilizes downlink TDOA as a radio measurement locating process for determining mobile device locations within a demarcated area. In one embodiment, as the downlink TDOA process is repeated for the same mobile device 702 or other mobile devices, position learning can be employed based on RF channel characteristics of messages utilized during the downlink TDOA processes. For example, the mobile device 702 can collect RF characteristics $RF_{MA}$, $RF_{MB}$, $RF_{MC}$ from received REQ and/or RSP messages from the anchors 701. As described herein, the REQ messages and the RSP messages are utilized by system 1100 to perform the downlink TDOA process for calculating the location of the mobile device 702. In one embodiment, the mobile device 702 can collect and generate an RF fingerprint model 1104. In another embodiment, the mobile device 702 can transmit the data samples, which include the RF channel characteristics corresponding to the particular location, to another device (e.g., a server) that generates an RF fingerprint model 1104. The RF characteristics can be various types or combinations such as RSS and/or CIR. In one embodiment, the mobile device 702 can utilize the radio measurements that are generated as a result of communication of the REQ messages and the RSP messages to perform the downlink TDOA calculation which determines a location of the mobile device 702. In another embodiment, the mobile device 702 can transmit the radio measurements corresponding to the particular location to another device (e.g., a server), which can utilize the radio measurements to perform the downlink TDOA calculation which determines the location of the mobile device 702.

As the mobile device 702 (or other mobile devices) traverses the demarcated area and as the downlink TDOA process is repeated to calculate various positions within the demarcated area, the mobile device 702 and/or another device can form a training set from the RF channel characteristics and the corresponding calculated locations. The mobile device 702 and/or another device can then train a machine learning model(s) 1104 which can learn an RF fingerprint of the demarcated area. Various machine learning algorithms can be utilized as described with respect to system 700 of FIG. 12. In one or more embodiments, a single RF fingerprint model 1104 for all mobile devices, one RF fingerprint model 1104 for each type of mobile device, and/or a unique RF fingerprint model 1104 for each mobile device can be maintained for the demarcated area.

Once the RF fingerprint model 1104 is generated, new RF channel characteristics that are determined for the mobile device 702 (from the new REQ and/or RSP messages received by the mobile device 702 as described above) can then be utilized in conjunction with the RF fingerprint model 1104 to determine a location of the mobile device 702. This analysis utilizing the RF fingerprint model 1104 can be performed by the mobile device 702 and/or another device. In one embodiment, the location determined from the RF fingerprint model 1104 (e.g., RF-based location) can be compared with the location calculated from the new REQ and/or RSP messages via the downlink TDOA process (e.g., RM-based location) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the downlink TDOA calculation or the RM-based location may be deemed faulty, in which case the RF-based location calculation may be the only location calculation utilized in this instance. In one embodiment, the RF fingerprint model 1104 can be adjusted according to subsequent location determinations, such as increasing the resolution of the location determinations via the RF fingerprint model by providing a more robust training data set.

Figure 17:
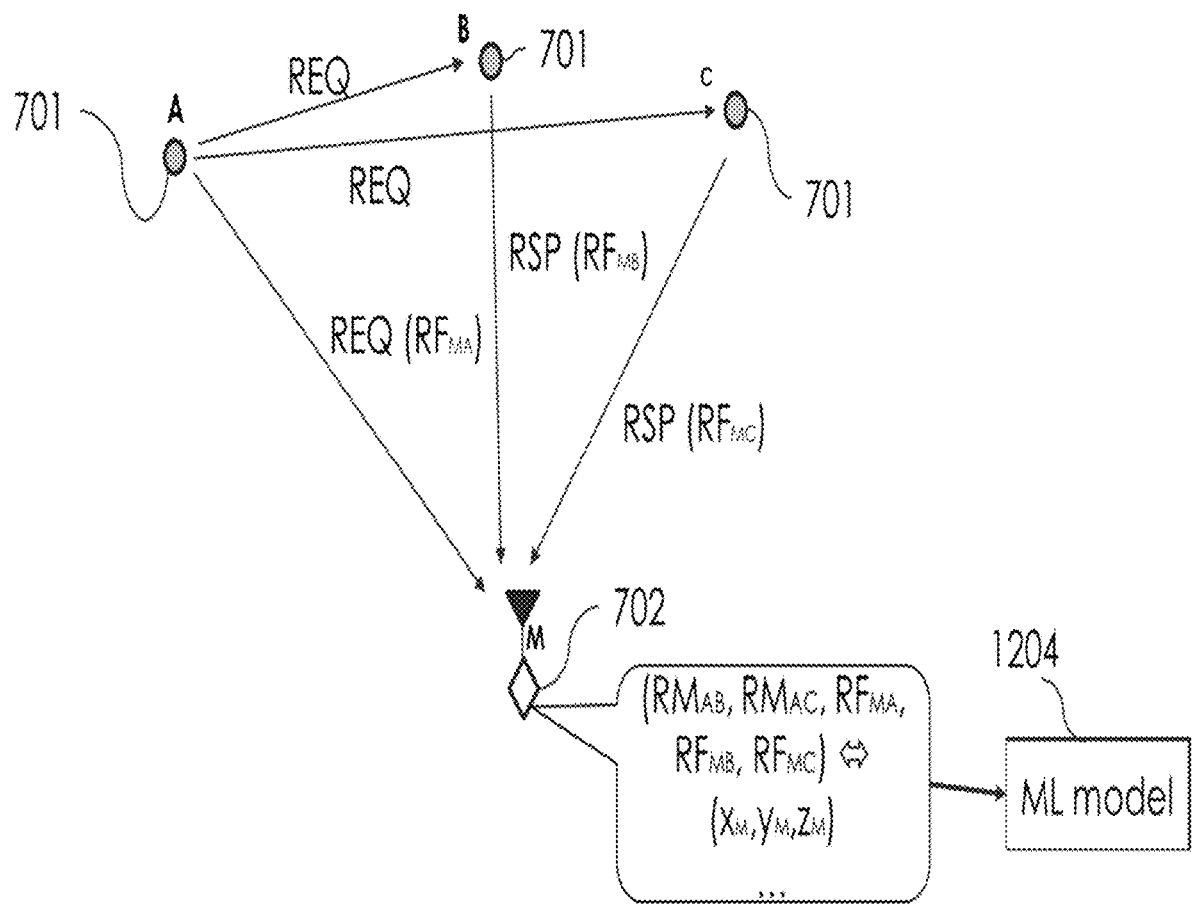

FIG. 17 is a block diagram of a portion of a system 1200 illustrating an exemplary, non-limiting embodiment of the mobile device 702 and the stationary anchors 701 in accordance with various aspects described herein. System 1200 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 1200 shows one mobile device or object 702, although any number of mobile devices can be utilized, such as shown in FIG. 7. The mobile device 702 can be similar to those as described in system 700 of FIG. 12 or as described with respect to other embodiments herein.

System 1200 utilizes downlink TDOA as a radio measurement locating process for determining mobile device locations within a demarcated area but expands the data set to include the radio measurements. In one embodiment, as the downlink TDOA process is repeated for the same mobile device 702 or other mobile devices, position learning can be employed based on the radio measurements and the RF channel characteristics of messages utilized during the downlink TDOA processes. For example, the mobile device 702 can collect RF characteristics $RF_{MA}$, $RF_{MB}$, $RF_{MC}$ from received REQ and/or RSP messages from the anchors 701. As described herein, the REQ messages and the RSP messages are utilized by system 1100 to perform the downlink TDOA process for calculating the location of the mobile device 702.

In one embodiment, the mobile device 702 can collect and generate an RF fingerprint model 1204. In another embodiment, the mobile device 702 can transmit the data samples, which include the RF channel characteristics corresponding to the particular location and the radio measurements $RM_{AB}$, $RM_{AC}$ that are utilized by the downlink TDOA calculation, to another device (e.g., a server) that generates an RF fingerprint model 1204. The RF characteristics can be various types or combinations such as RSS and/or CIR. In one embodiment, the mobile device 702 can utilize the radio measurements that are generated as a result of communication of the REQ messages and the RSP messages to perform the downlink TDOA calculation which determines a location of the mobile device 702. In another embodiment, the mobile device 702 can transmit the radio measurements corresponding to the particular location to another device (e.g., a server), which can utilize the radio measurements to perform the downlink TDOA calculation which determines the location of the mobile device 702.

As the mobile device 702 (or other mobile devices) traverses the demarcated area and as the downlink TDOA process is repeated to calculate various positions within the demarcated area, the mobile device 702 and/or another device can form a training set from the RF channel characteristics, the radio measurements and the corresponding calculated locations. The mobile device 702 and/or another device can then train a machine learning model(s) 1204 which can learn an RF fingerprint of the demarcated area. Various machine learning algorithms can be utilized as described with respect to system 700 of FIG. 12. In one or more embodiment, a single RF fingerprint model 1204 for all mobile devices, one RF fingerprint model 1204 for each type of mobile device, and/or a unique RF fingerprint model 1204 for each mobile device can be maintained for the demarcated area.

Once the RF fingerprint model 1204 is generated, new RF channel characteristics and radio measurements that are determined for the mobile device 702 (from the new REQ and/or RSP messages received by the mobile device 702 as described above) can then be utilized in conjunction with the RF fingerprint model 1204 to determine a location of the mobile device 702. This analysis utilizing the RF fingerprint model 1104 can be performed by the mobile device 702 and/or another device. In one embodiment, the location determined from the RF fingerprint model 1204 (e.g., RF-based location) can be compared with the location calculated from the new REQ and/or RSP messages via the downlink TDOA process (e.g., RM-based location) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the downlink TDOA calculation or the RM-based location may be deemed faulty, in which case the RF-based location calculation may be the only location calculation utilized in this instance. In one embodiment, the RF fingerprint model 1204 can be adjusted according to subsequent location determinations, such as increasing the resolution of the location determinations via the RF fingerprint model by providing a more robust training data set.

Figure 18:
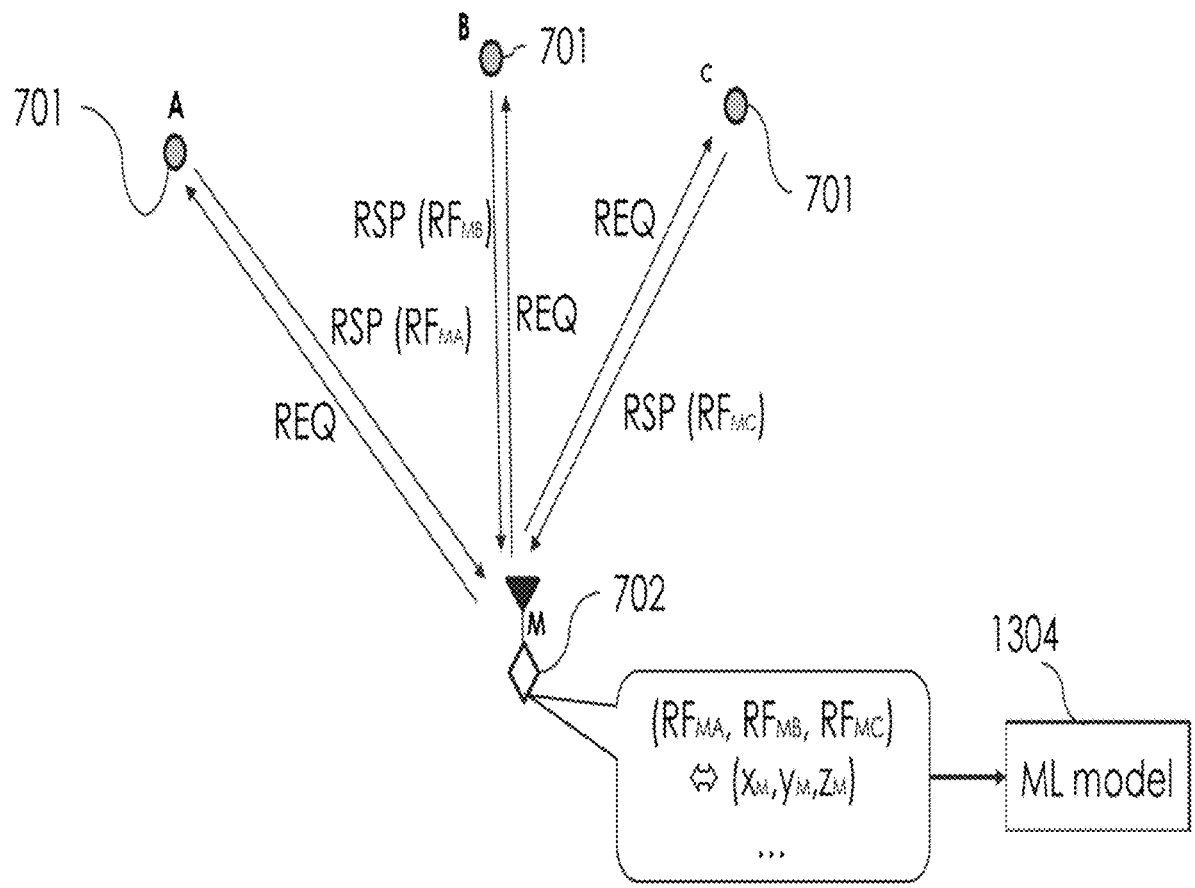

FIG. 18 is a block diagram of a portion of a system 1300 illustrating an exemplary, non-limiting embodiment of the mobile device 702 and the stationary anchors 701 in accordance with various aspects described herein. System 1300 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 1300 shows one mobile device or object 702, although any number of mobile devices can be utilized, such as shown in FIG. 7. The mobile device 702 can be similar to those as described in system 1300 of FIG. 12 or as described with respect to other embodiments herein.

System 1300 utilizes downlink TW-TOA as a radio measurement locating process for determining mobile device locations within a demarcated area. In one embodiment, as the downlink TW-TOA process is repeated for the same mobile device 702 or other mobile devices, position learning can be employed based on RF channel characteristics of messages utilized during the downlink TW-TOA processes. For example, the mobile device 702 can collect RF characteristics $RF_{MA}$, $RF_{MB}$, $RF_{MC}$ from received RSP messages from the anchors 701. As described herein, the REQ messages and the RSP messages are utilized by system 1300 to perform the downlink TW-TOA process for calculating the location of the mobile device 702. In one embodiment, the mobile device 702 can collect and generate an RF fingerprint model 1304. In another embodiment, the mobile device 702 can transmit the data samples, which include the RF channel characteristics corresponding to the particular location, to another device (e.g., a server) that generates an RF fingerprint model 1304. The RF characteristics can be various types or combinations such as RSS and/or CIR. In one embodiment, the mobile device 702 can utilize the radio measurements that are generated as a result of communication of the REQ messages and the RSP messages to perform the downlink TW-TOA calculation which determines a location of the mobile device 702. In another embodiment, the mobile device 702 can transmit the radio measurements corresponding to the particular location to another device (e.g., a server), which can utilize the radio measurements to perform the downlink TW-TOA calculation which determines the location of the mobile device 702.

As the mobile device 702 (or other mobile devices) traverses the demarcated area and as the downlink TW-TOA process is repeated to calculate various positions within the demarcated area, the mobile device 702 and/or another device can form a training set from the RF channel characteristics and the corresponding calculated locations. The mobile device 702 and/or another device can then train a machine learning model(s) 1304 which can learn an RF fingerprint of the demarcated area. Various machine learning algorithms can be utilized as described with respect to system 700 of FIG. 12. In one or more embodiments, a single RF fingerprint model 1304 for all mobile devices, one RF fingerprint model 1304 for each type of mobile device, and/or a unique RF fingerprint model 1304 for each mobile device can be maintained for the demarcated area.

Once the RF fingerprint model 1304 is generated, new RF channel characteristics that are determined for the mobile device 702 (from the new RSP messages received by the mobile device 702 as described above) can then be utilized in conjunction with the RF fingerprint model 1304 to determine a location of the mobile device 702. This analysis utilizing the RF fingerprint model 1304 can be performed by the mobile device 702 and/or another device. In one embodiment, the location determined from the RF fingerprint model 1304 (e.g., RF-based location) can be compared with the location calculated from the new RSP messages via the downlink TW-TOA process (e.g., RM-based location) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the downlink TW-TOA calculation or the RM-based location may be deemed faulty, in which case the RF-based location calculation may be the only location calculation utilized in this instance. In one embodiment, the RF fingerprint model 1304 can be adjusted according to subsequent location determinations, such as increasing the resolution of the location determinations via the RF fingerprint model by providing a more robust training data set.

Figure 19:
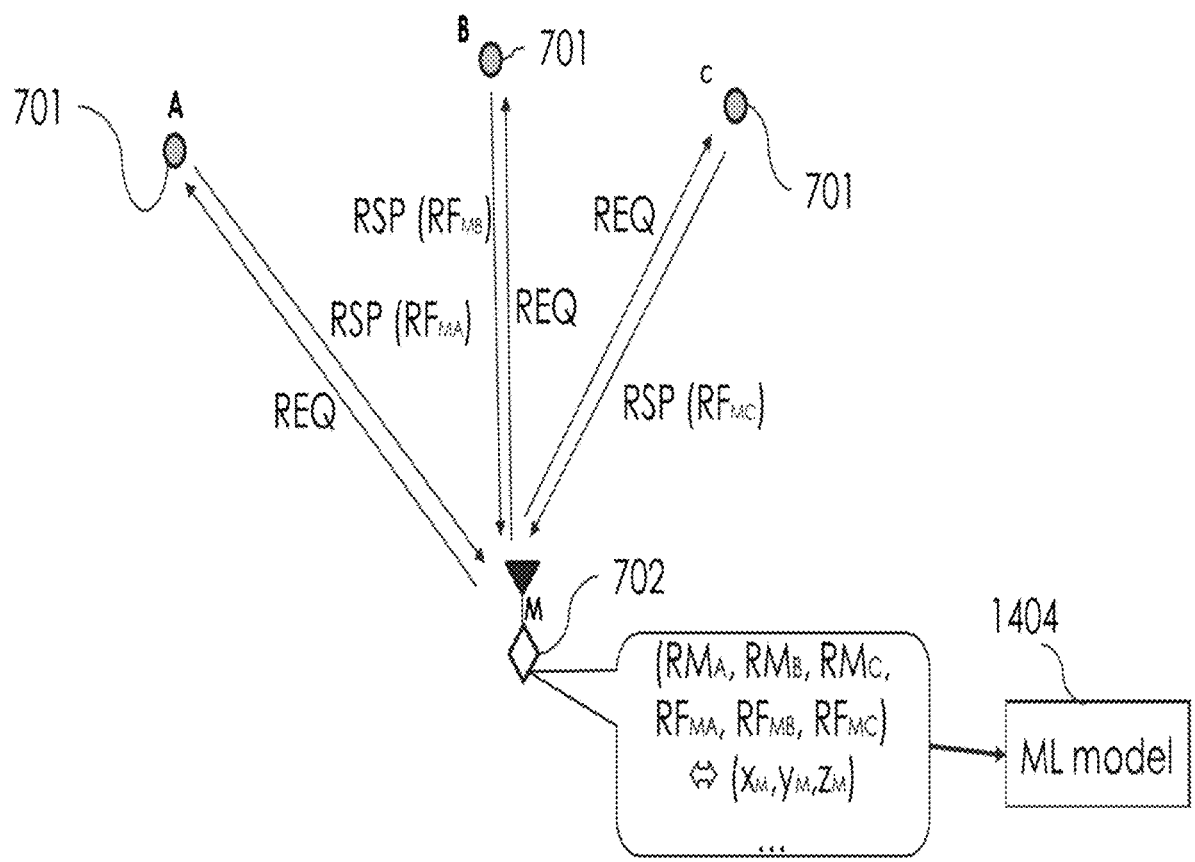

FIG. 19 is a block diagram of a portion of a system 1400 illustrating an exemplary, non-limiting embodiment of the mobile device 702 and the stationary anchors 701 in accordance with various aspects described herein. System 1400 shows three anchors 701 that facilitate determining the position of mobile device 702 in a demarcated area, although any number of anchors in various configurations and layouts can be utilized, such as shown in FIG. 7. The anchors 701 can be similar to those as described in system 700 of FIG. 12. System 1400 shows one mobile device or object 702, although any number of mobile devices can be utilized, such as shown in FIG. 7. The mobile device 702 can be similar to those as described in system 700 of FIG. 12 or as described with respect to other embodiments herein.

System 1400 utilizes downlink TW-TOA as a radio measurement locating process for determining mobile device locations within a demarcated area but expands the data set to include the radio measurements. In one embodiment, as the downlink TW-TOA process is repeated for the same mobile device 702 or other mobile devices, position learning can be employed based on the radio measurements and the RF channel characteristics of messages utilized during the downlink TW-TOA processes. For example, the mobile device 702 can collect RF characteristics $RF_{MA}$, $RF_{MB}$, $RF_{MC}$ from received RSP messages from the anchors 701. As described herein, the REQ messages and the RSP messages are utilized by system 1400 to perform the downlink TW-TOA process for calculating the location of the mobile device 702.

In one embodiment, the mobile device 702 can collect and generate an RF fingerprint model 1404. In another embodiment, the mobile device 702 can transmit the data samples, which include the RF channel characteristics corresponding to the particular location and the radio measurements $RM_A$, $RM_A$, $RM_C$ that are utilized by the downlink TW-TOA calculation, to another device (e.g., a server) that generates an RF fingerprint model 1404. The RF characteristics can be various types or combinations such as RSS and/or CIR. In one embodiment, the mobile device 702 can utilize the radio measurements that are generated as a result of communication of the REQ messages and the RSP messages to perform the downlink TW-TOA calculation which determines a location of the mobile device 702. In another embodiment, the mobile device 702 can transmit the radio measurements corresponding to the particular location to another device (e.g., a server), which can utilize the radio measurements to perform the downlink TW-TOA calculation which determines the location of the mobile device 702.

As the mobile device 702 (or other mobile devices) traverses the demarcated area and as the downlink TW-TOA process is repeated to calculate various positions within the demarcated area, the mobile device 702 and/or another device can form a training set from the RF channel characteristics, the radio measurements and the corresponding calculated locations. The mobile device 702 and/or another device can then train a machine learning model(s) 1404 which can learn an RF fingerprint of the demarcated area. Various machine learning algorithms can be utilized as described with respect to system 700 of FIG. 12. In one or more embodiments, a single RF fingerprint model 1404 for all mobile devices, one RF fingerprint model 1404 for each type of mobile device, and/or a unique RF fingerprint model 1404 for each mobile device can be maintained for the demarcated area.

Once the RF fingerprint model 1404 is generated, new RF channel characteristics and radio measurements that are determined for the mobile device 702 (from the new RSP messages received by the mobile device 702 as described above) can then be utilized in conjunction with the RF fingerprint model 1404 to determine a location of the mobile device 702. This analysis utilizing the RF fingerprint model 1404 can be performed by the mobile device 702 and/or another device. In one embodiment, the location determined from the RF fingerprint model 1404 (e.g., RF-based location) can be compared with the location calculated from the new RSP messages via the downlink TW-TOA process (e.g., RM-based location) to determine accuracy of the location determinations. In another embodiment, the comparison of the RF-based location and the RM-based location can be utilized for providing accuracy scores for one or both of the RF-based location calculation and the RM-based location calculation. In one embodiment, there may not be sufficient radio measurement data to perform the downlink TW-TOA calculation or the RM-based location may be deemed faulty, in which case the RF-based location calculation may be the only location calculation utilized in this instance. In one embodiment, the RF fingerprint model 1404 can be adjusted according to subsequent location determinations, such as increasing the resolution of the location determinations via the RF fingerprint model by providing a more robust training data set.

Figure 20:
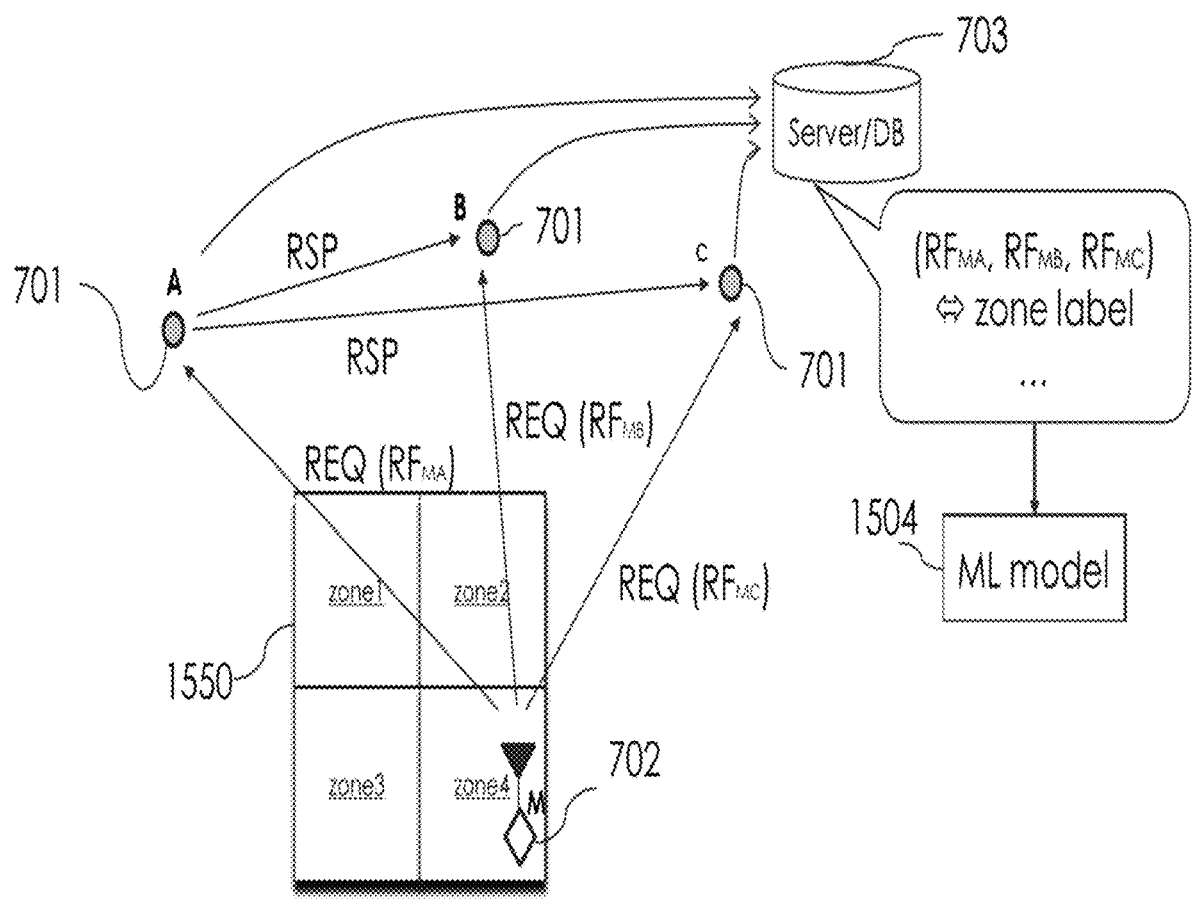

FIG. 20 is a block diagram of a portion of a system 1500 illustrating an exemplary, non-limiting embodiment of the mobile device 702, stationary anchors 701, and server 703. System 1500 can include devices and perform functions similar to system 700 of FIG. 12 including repeatedly performing uplink TDOA as radio measurement locating processes for determining mobile device locations within a demarcated area 1550. As described above, position learning can then be employed based on RF channel characteristics (e.g., RSS and/or CIR) of messages utilized during the uplink TDOA processes. In this embodiment, the training data set can be labeled to a zone (rather than a particular location) of the demarcated area 1550 and an RF training model(s) 1504 can be generated. The zone label can be generated from the calculated position of using uplink TDOA measurements. Various machine learning algorithms can be utilized in building the machine learning model 1504, such as support vector machines, neural networks, K-nearest neighbors, gradient boosting, other classification analysis, and so forth. The RF training model(s) 1504 can then be utilized as described above to identify a zone of the mobile device 702, as well as for comparison to other location calculations, and so forth.

Figure 21:
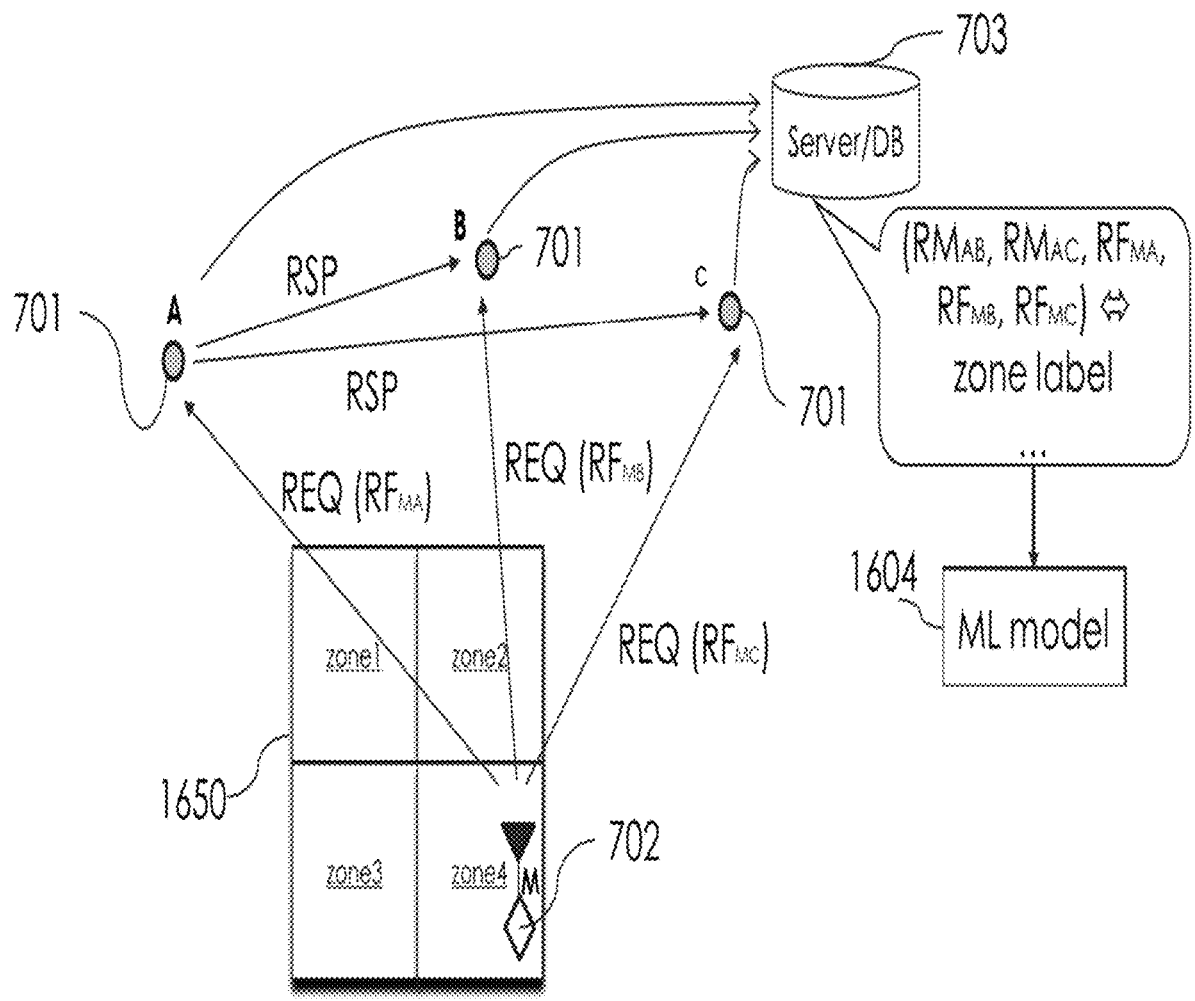

FIG. 21 is a block diagram of a portion of a system 1600 illustrating an exemplary, non-limiting embodiment of the mobile device 702, stationary anchors 701, and server 703. System 1600 can include devices and perform functions similar to system 800 of FIG. 13 including repeatedly performing uplink TDOA as radio measurement locating processes for determining mobile device locations within a demarcated area 1650. As described above, position learning can then be employed based on RF channel characteristics (e.g., RSS and/or CIR) of messages utilized during the uplink TDOA processes and based on radio measurements. In this embodiment, the training data set can be labeled to a zone (rather than a particular location) of the demarcated area 1650 and an RF training model(s) 1604 can be generated. The zone label can be generated from the calculated position of using uplink TDOA measurements. Various machine learning algorithms can be utilized in building the machine learning model 1604, such as support vector machines, neural networks, K-nearest neighbors, gradient boosting, other classification analysis, and so forth. The RF training model(s) 1604 can then be utilized as described above to identify a zone of a mobile device 702, as well as for comparison to other location calculations, and so forth.

Figure 22:
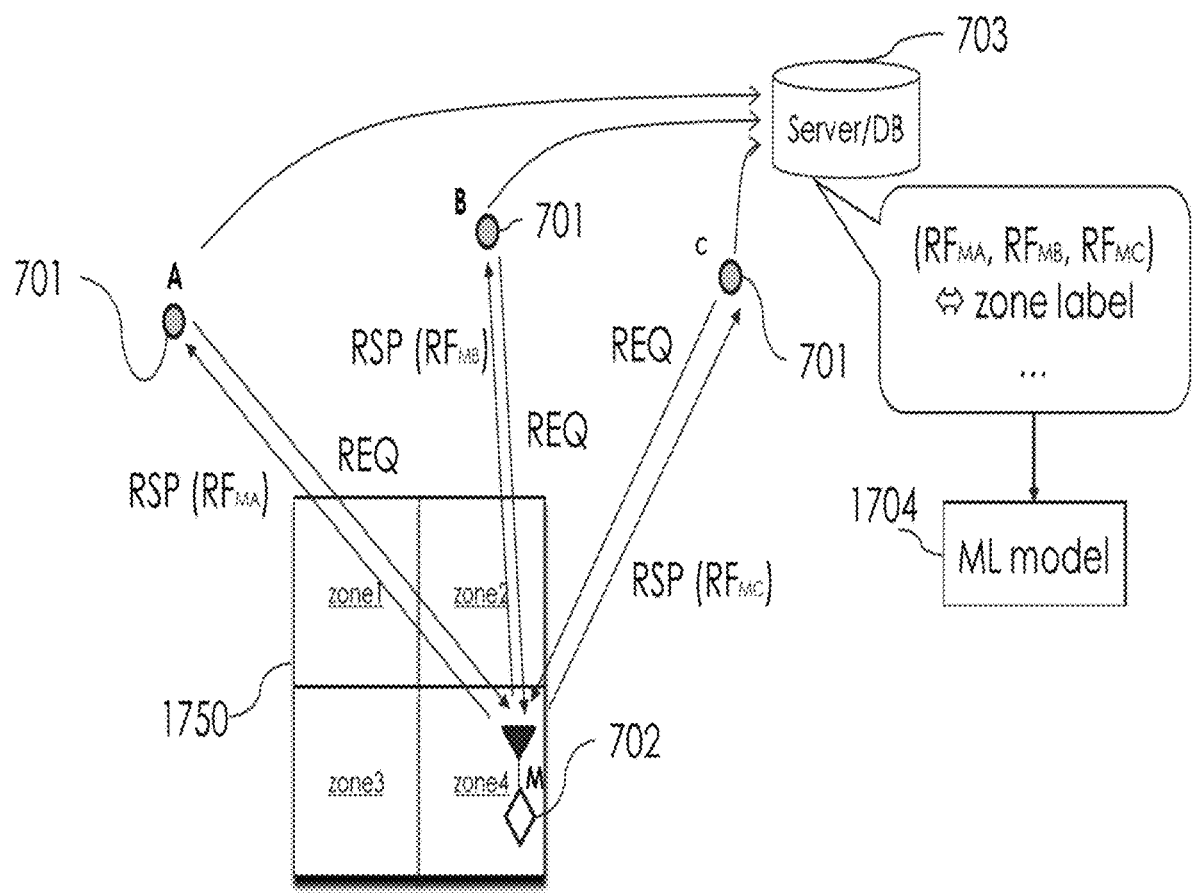

FIG. 22 is a block diagram of a portion of a system 1700 illustrating an exemplary, non-limiting embodiment of the mobile device 702, stationary anchors 701, and server 703. System 1700 can include devices and perform functions similar to system 900 of FIG. 14 including repeatedly performing uplink TW-TOA as radio measurement locating processes for determining mobile device locations within a demarcated area 1750. As described above, position learning can then be employed based on RF channel characteristics (e.g., RSS and/or CIR) of messages utilized during the uplink TW-TOA processes. In this embodiment, the training data set can be labeled to a zone (rather than a particular location) of the demarcated area 1750 and an RF training model(s) 1704 can be generated. The zone label can be generated from the calculated position of using uplink TW-TOA measurements. Various machine learning algorithms can be utilized in building the machine learning model 1704, such as support vector machines, neural networks, K-nearest neighbors, gradient boosting, other classification analysis, and so forth. The RF training model(s) 1704 can then be utilized as described above to identify a zone of the mobile device 702, as well as for comparison to other location calculations, and so forth.

Figure 23:
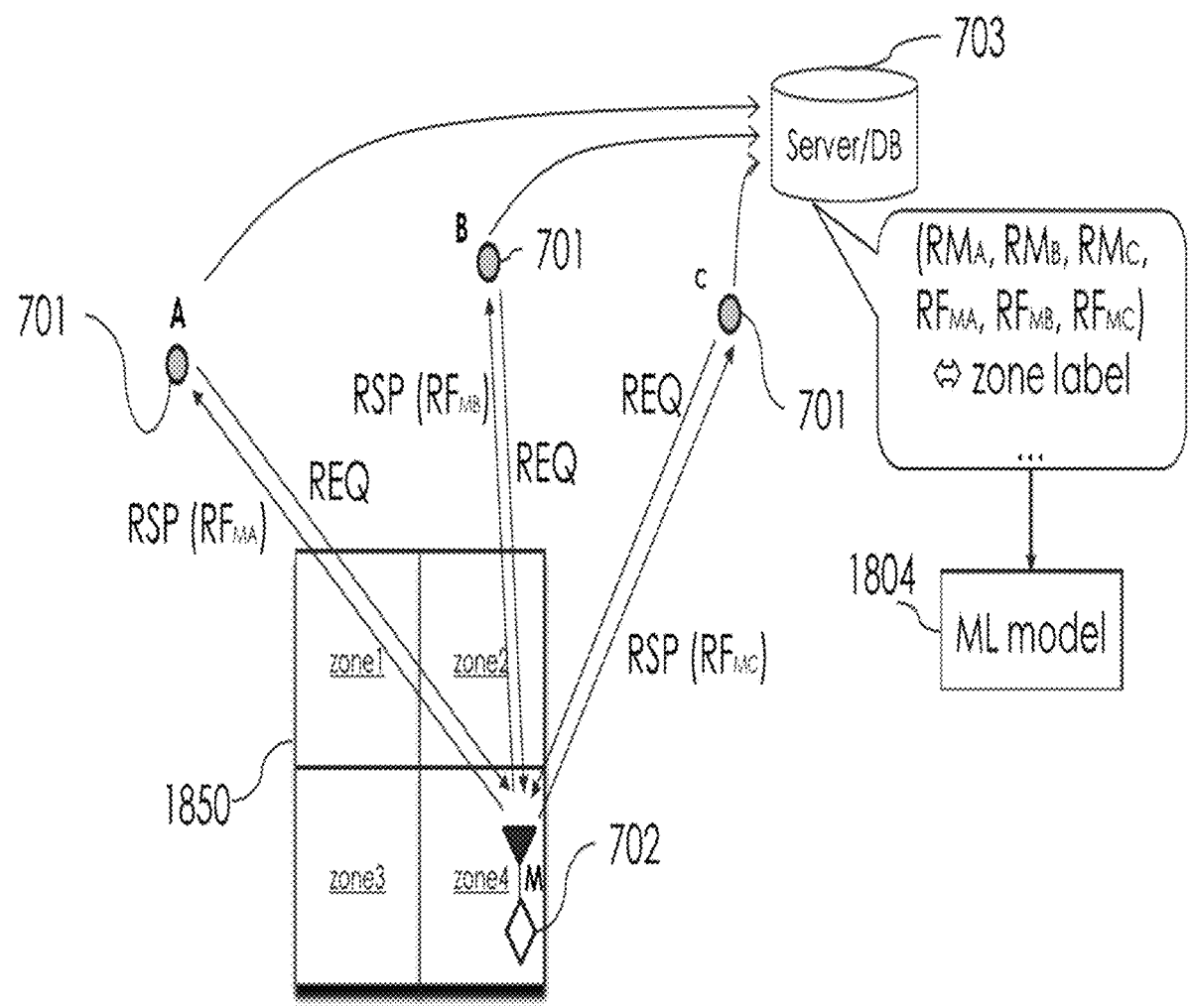

FIG. 23 is a block diagram of a portion of a system 1800 illustrating an exemplary, non-limiting embodiment of the mobile device 702, stationary anchors 701, and server 703. System 1800 can include devices and perform functions similar to system 1000 of FIG. 15 including repeatedly performing uplink TW-TOA as radio measurement locating processes for determining mobile device locations within a demarcated area 1850. As described above, position learning can then be employed based on RF channel characteristics (e.g., RSS and/or CIR) of messages utilized during the uplink TW-TOA processes and based on radio measurements. In this embodiment, the training data set can be labeled to a zone (rather than a particular location) of the demarcated area 1850 and an RF training model(s) 1804 can be generated. The zone label can be generated from the calculated position of using uplink TW-TOA measurements. Various machine learning algorithms can be utilized in building the machine learning model 1804, such as support vector machines, neural networks, K-nearest neighbors, gradient boosting, other classification analysis, and so forth. The RF training model(s) 1804 can then be utilized as described above to identify a zone of a mobile device 702, as well as for comparison to other location calculations, and so forth.

Figure 24:
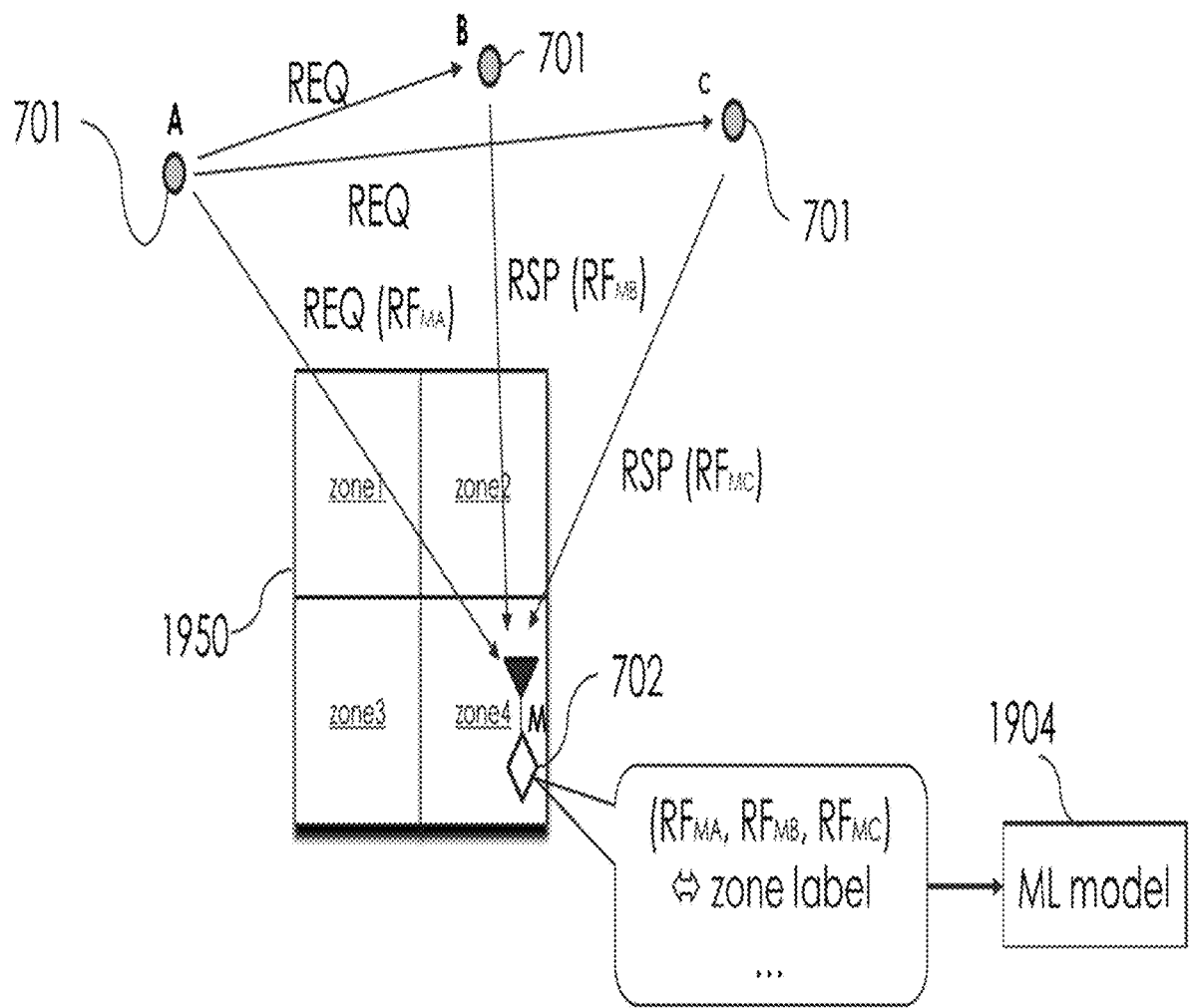

FIG. 24 is a block diagram of a portion of a system 1900 illustrating an exemplary, non-limiting embodiment of the mobile device 702, stationary anchors 701, and server 703. System 1900 can include devices and perform functions similar to system 1100 of FIG. 16 including repeatedly performing downlink TDOA as radio measurement locating processes for determining mobile device locations within a demarcated area 1950. As described above, position learning can then be employed based on RF channel characteristics (e.g., RSS and/or CIR) of messages utilized during the downlink TDOA processes. In this embodiment, the training data set can be labeled to a zone (rather than a particular location) of the demarcated area 1950 and an RF training model(s) 1904 can be generated. The zone label can be generated from the calculated position of using downlink TDOA measurements. Various machine learning algorithms can be utilized in building the machine learning model 1904, such as support vector machines, neural networks, K-nearest neighbors, gradient boosting, other classification analysis, and so forth. The RF training model(s) 1904 can then be utilized as described above to identify a zone of the mobile device 702, as well as for comparison to other location calculations, and so forth.

Figure 25:
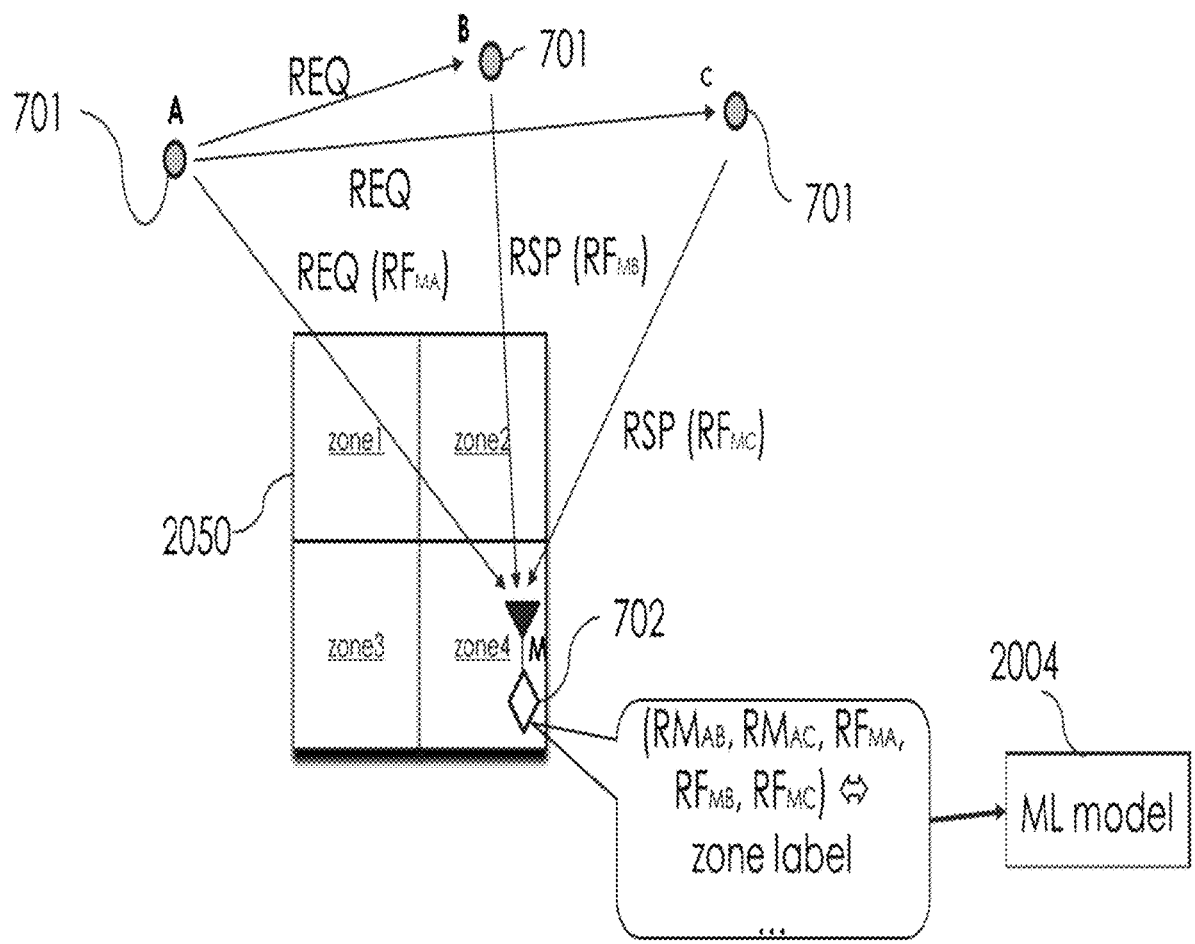

FIG. 25 is a block diagram of a portion of a system 2000 illustrating an exemplary, non-limiting embodiment of the mobile device 702, stationary anchors 701, and server 703. System 2000 can include devices and perform functions similar to system 1200 of FIG. 17 including repeatedly performing downlink TDOA as radio measurement locating processes for determining mobile device locations within a demarcated area 2050. As described above, position learning can then be employed based on RF channel characteristics (e.g., RSS and/or CIR) of messages utilized during the downlink TDOA processes and based on radio measurements. In this embodiment, the training data set can be labeled to a zone (rather than a particular location) of the demarcated area 2050 and an RF training model(s) 2004 can be generated. The zone label can be generated from the calculated position of using downlink TDOA measurements. Various machine learning algorithms can be utilized in building the machine learning model 2004, such as support vector machines, neural networks, K-nearest neighbors, gradient boosting, other classification analysis, and so forth. The RF training model(s) 2004 can then be utilized as described above to identify a zone of a mobile device 702, as well as for comparison to other location calculations, and so forth.

Figure 26:
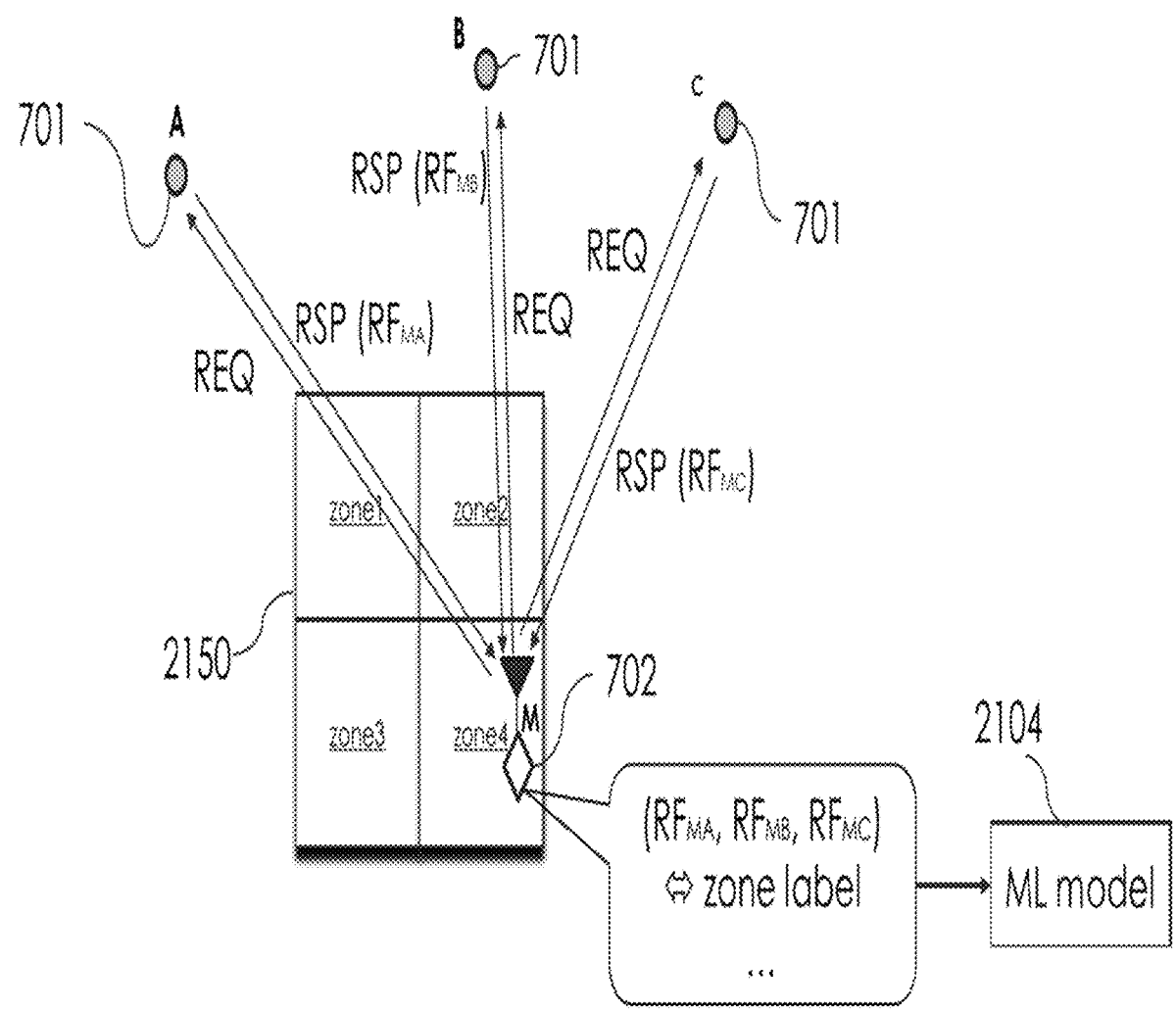

FIG. 26 is a block diagram of a portion of a system 2100 illustrating an exemplary, non-limiting embodiment of the mobile device 702, stationary anchors 701, and server 703. System 2100 can include devices and perform functions similar to system 1300 of FIG. 18 including repeatedly performing downlink TW-TOA as radio measurement locating processes for determining mobile device locations within a demarcated area 2150. As described above, position learning can then be employed based on RF channel characteristics (e.g., RSS and/or CIR) of messages utilized during the downlink TW-TOA processes. In this embodiment, the training data set can be labeled to a zone (rather than a particular location) of the demarcated area 2150 and an RF training model(s) 2104 can be generated. The zone label can be generated from the calculated position of using downlink TW-TOA measurements. Various machine learning algorithms can be utilized in building the machine learning model 2104, such as support vector machines, neural networks, K-nearest neighbors, gradient boosting, other classification analysis, and so forth. The RF training model(s) 2104 can then be utilized as described above to identify a zone of the mobile device 702, as well as for comparison to other location calculations, and so forth.

Figure 27:
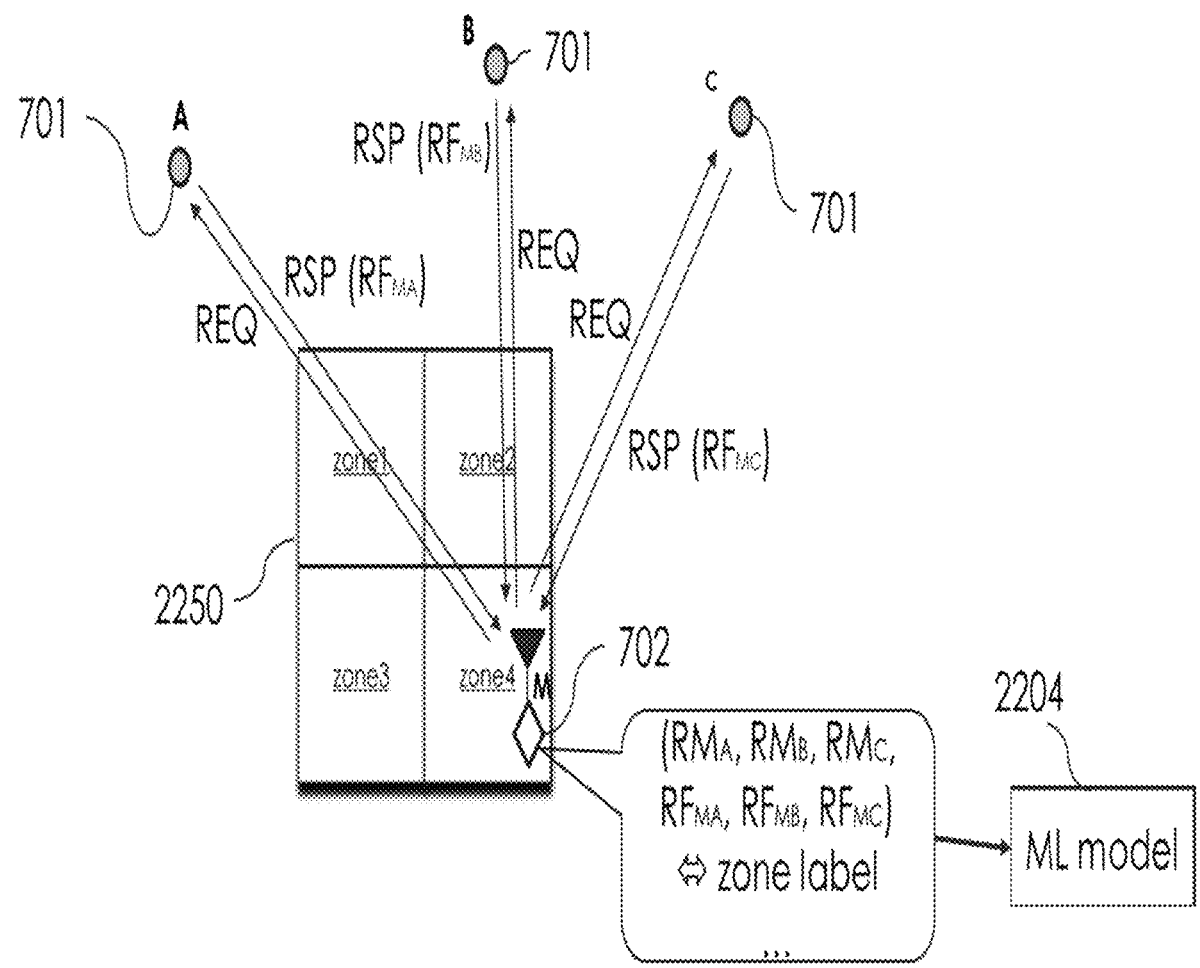

FIG. 27 is a block diagram of a portion of a system 2200 illustrating an exemplary, non-limiting embodiment of the mobile device 702, stationary anchors 701, and server 703. System 2200 can include devices and perform functions similar to system 1400 of FIG. 19 including repeatedly performing downlink TW-TOA as radio measurement locating processes for determining mobile device locations within a demarcated area 2250. As described above, position learning can then be employed based on RF channel characteristics (e.g., RSS and/or CIR) of messages utilized during the downlink TW-TOA processes and based on radio measurements. In this embodiment, the training data set can be labeled to a zone (rather than a particular location) of the demarcated area 2250 and an RF training model(s) 2204 can be generated. The zone label can be generated from the calculated position of using downlink TW-TOA measurements. Various machine learning algorithms can be utilized in building the machine learning model 2204, such as support vector machines, neural networks, K-nearest neighbors, gradient boosting, other classification analysis, and so forth. The RF training model(s) 2204 can then be utilized as described above to identify a zone of a mobile device 702, as well as for comparison to other location calculations, and so forth.

Figure 28:
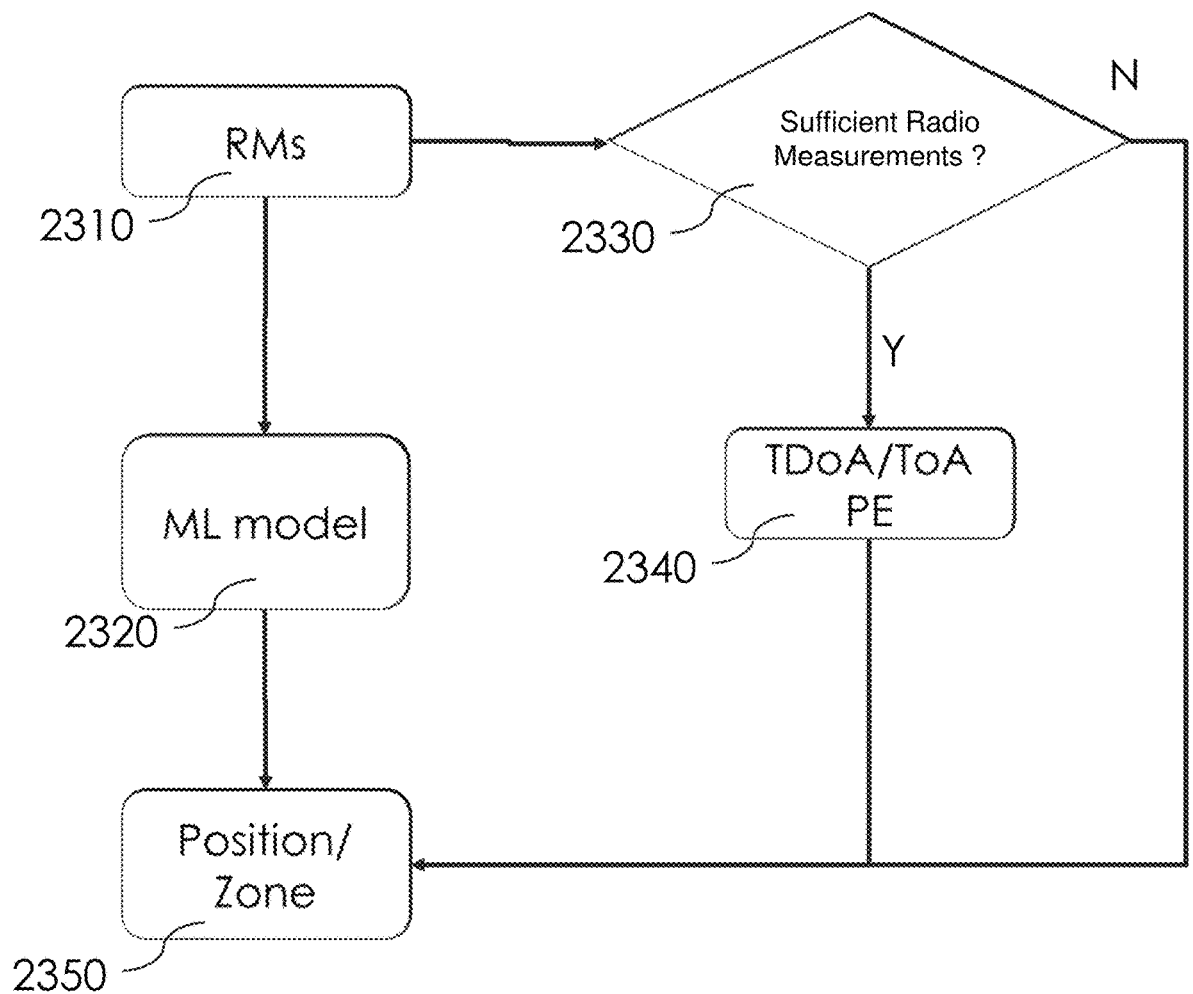
FIG. 28 depicts an illustrative embodiment of a method for determining location information and uses thereof in accordance with various aspects described herein.

FIG. 28 depicts an illustrative embodiment of a method 2300 in accordance with various aspects described herein. Method 2300 can employ location determination that is based on radio measurements (e.g., TDOA, TOA, and so forth) and that is based on RF fingerprint modeling. In one embodiment, utilizing both RF characteristic data and radio measurements as features in the machine learning can result in the trained machine learning model combining both information to provide an estimate or comparison on the mobile device position or interested metric (e.g., zone).

In another embodiment, if RF characteristic data is only utilized in the machine learning (i.e., does not utilize radio measurements as part of the training data set), then there are two ways to estimate mobile device position or the interested metric (e.g., zone): one is from the RF fingerprint model and the other is from the radio measurement locating process (e.g., TDOA or TOA with the instantaneous radio measurements).

At 2310 messaging in employed by a real time location system as part of radio measurement locating processes for one or more mobile devices to determine locations for the one or more mobile devices within a demarcated area associated with a plurality of anchors. As described herein, an RF fingerprint model(s) for the demarcated area can be generated by applying an RF training set from RF channel characteristics (for some of the messages utilized by the real time location system) and locations determined for the one or more mobile devices within the demarcated area during previous radio measurement locating process (e.g., TDOA, TOA and so forth). Various techniques can be utilized to generate the RF fingerprint model including machine learning.

At 2320, particular RF channel characteristic(s) can be provided to an RF fingerprint model. For instance, the particular RF characteristics can be of particular messages being transmitted from a mobile device or being received by the mobile device. A location (referred to as an "RF-based location") of the mobile device can then be determined according to the RF fingerprint model.

At 2330, a determination can be made if there are sufficient radio measurements (e.g., including the particular messages being transmitted from a mobile device or being received by the mobile device) for performing a radio measurement locating process (e.g., TDOA, TOA and so forth). If it is determined that there are sufficient radio measurements, then at 2340 a location (referred to as an "RM-based location") of the mobile device can then be determined according to the radio measurement locating process (e.g., TDOA, TOA and so forth). Otherwise, method 2300 proceeds to step 2350 and can rely only on the RF-based location instead. At 2350, the RF-based location and the RM-based location can be analyzed and compared. This analysis and comparison can indicate accuracy of the RF and RM-based locations (e.g., the RF and RM-based locations are within a threshold of each other), provide an accuracy score, indicate that there is potentially interference in the demarcated area, indicate that there has potentially been a change to the layout of the demarcated area, and so forth.

In one or more embodiments, the RF fingerprint model for positions or zones can be based on the RF channel characteristics of less than all of the object/anchor communications. In one or more embodiments, the RF channel characteristics can also be based on characteristics of the mobile device. For example, the machine learning can account for mobile devices that have different radio characteristics such as a difference in the transmitters (e.g., a weaker radio vs a stronger radio). In one or more embodiments, the RF channel characteristics can confirm the radio measurements and/or can determine that there is a non-LOS situation, noise and/or reflection in the radio measurement determination. In one or more embodiments, if the system receives RF channel characteristics and is unable to map to a particular RF fingerprint (e.g., within a threshold) then this can be indicative of, and generate a warning for, anchor movement or area layout change.

In one or more embodiments, as more radio measurement data is collected (and more RF channel characteristics collected) then the RF fingerprint model can become more accurate. In one or more embodiments, the training of the RF model can be repeated based on the collection of a sufficient additional number of RF channel characteristics, which can be the same type of RF channel characteristics or different types, such as initially training on RSS samples and then training on CIR samples). In one or more embodiments, the real time location system can begin with location determinations that are based on radio measurement locating process (e.g., TDOA, TOA and so forth) and then can begin utilizing the RF fingerprint process when the RF fingerprint model(s) is built. In this example, the real time location system can utilize the RF fingerprint process alone or can utilize both of the radio measurement locating process (e.g., TDOA, TOA and so forth) and the RF fingerprint process. In one or more embodiments, if there are not enough radio measurements to make a determination according to TDOA or TOA then the RF fingerprint process can be utilized alone.

In one or more embodiments, changes to the area can be monitored such as through re-collecting of the data sample and re-training of the RF fingerprint model. For example, a rack may be changed in the factory and the RF fingerprint model adapts (e.g., due to new radio measurement messages resulting in collecting new RF channel characteristic data) without needing to perform an RF site survey of the changed area. In another example, differences in the RM-based location, the RF-based location and/or RF site survey data can be monitored to determine potential changes to the area (e.g., change in area layout (such as a shelf being added, removed or moved), an anchor adjustment (such as an anchor being added, removed or moved), and so forth). In one embodiment, movement of an anchor (whose known location has been updated by the real time location system) can be confirmed according to monitoring and comparing of RM-based location, the RF-based location and/or RF site survey data for one or more mobile devices.

In one or more embodiments, if the RF channel characteristics significantly changes for a particular position (e.g., comparison to mapped RF channel characteristics and/or comparison to data from the radio measurement locating process) then this could mean that an anchor has been moved (or other change occurred such as shelf added/removed) and a warning can be generated based on the change being outside of, or otherwise no longer satisfying, a threshold.

In one or more embodiments, the location calculation based on the radio measurements and the location determination based on the RF fingerprint model can be performed at a same device or at different devices. For example, the devices that perform either or both of these calculations/determinations can be a server (e.g., in communication with one or more of the anchor and/or the mobile devices), the mobile devices, one or more of the anchors, or some other device(s). For example, in a downlink TDOA or TOA process, the mobile devices can obtain the data (such as the RF channel characteristics, the radio measurements and so forth) and can provide that data to a separate server, which has access to the RF fingerprint model(s) to perform the location determination based on the RF fingerprint model and/or which can perform the location calculation determination based on the radio measurements. In this example, the server can communicate with the mobile devices directly or via one or more of the anchors.

In one or more embodiments, the location calculation based on the radio measurements can include accuracy levels, such as based on a number of radio measurement determinations (e.g., number of geometric calculations for number of anchors). In one embodiment, these accuracy levels can be utilized as part of the comparison of the RM-based location to the RF-based location. In one embodiment, if a particular RM-based location for a particular mobile device has a high degree of confidence or high accuracy level due to multiple geometric calculations being performed based on messaging of many anchors then a change in the detected RF channel characteristics for that particular location can be indicative of (and/or result in generating a notice/warning of) a layout change of the area and/or a change to the mobile device radio's transmitting characteristics In one or more embodiments, new RF channel characteristics that are determined for a mobile device that has moved to a particular location may not be identical to one of the RF fingerprint vectors of the RF fingerprint mapping or model (i.e., the RF fingerprint vector that corresponds to that particular location). In this example, how close the measured vector is to the mapped vector can be utilized as a measure of accuracy (e.g., confidence scores) of location determination based on the RF channel characteristics. Continuing with this example, the RF-based location can further be compared to the RM-based location to determine accuracy.

In one or more embodiments, the radio measurements (or grouping thereof), along with the RF channel characteristic(s) (or groupings thereof) and/or other observed and calculated information (or groupings thereof) can be part of a fingerprint or signature, such as part of unique vector values, for each unique location within an area and/or for a zone (e.g., based on the groupings thereof) within the area.

One or more aspects of the subject disclosure include a device that utilizes a processing system including a processor and a memory that stores executable instructions that, when executed by the processing system, facilitate performance of operations. The operations can include identifying a location for each of a plurality of anchors having distributed positions in a demarcated area, determining, according to the location of each of the plurality of anchors, an arrangement of coverage areas of anchor pairs of the plurality of anchors that enables a determination of a mobile device location relative to one or more of the anchor pairs within the demarcated area, and identifying a transmission schedule for each of the anchor pairs to transmit a wireless signal that initiates a process to determine the mobile device location.

One or more aspects of the subject disclosure include a machine-readable medium comprising executable instructions that, when executed by a processing system including a processor, facilitate performance of operations. The operations can include determining, according to a location of each of a plurality of anchors, an arrangement of coverage areas of anchor pairs of the plurality of anchors to enable a determination of a mobile device location relative to one or more of the anchor pairs within a demarcated area, and identifying a transmission schedule for each of the anchor pairs to transmit a wireless signal that initiates a process to determine the mobile device location.

One or more aspects of the subject disclosure include a machine-readable medium comprising executable instructions that, when executed by a processing system including a processor, facilitate performance of operations. The operations can include determining, according to a location of each of a plurality of anchors, an arrangement of coverage areas of anchor pairs of the plurality of anchors to enable a determination of a mobile device location relative to one or more of the anchor pairs within a demarcated area, and identifying a transmission schedule for each of the anchor pairs to transmit a wireless signal that initiates a process to determine the mobile device location.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    determining, by a processing system including a processor, Radio Frequency (RF) characteristics for a plurality of messages that are wirelessly transmitted, the plurality of messages being communicated as part of radio measurement locating processes for one or more mobile devices, wherein the radio measurement locating processes determine locations for the one or more mobile devices within a demarcated area, and wherein the radio measurement locating processes use a plurality of anchors and a time difference of arrival process, a two-way time of arrival process, an angle of arrival process, or a combination thereof;
    generating, by the processing system, an RF training set from the RF characteristics and the locations determined for the one or more mobile devices within the demarcated area;
    applying, by the processing system, the RF training set to a machine learning process to generate an RF fingerprint model for the demarcated area; and
    determining, by the processing system according to the RF fingerprint model, a first location for a first mobile device according to particular RF characteristics determined from first messages transmitted from the first mobile device to at least some of the plurality of anchors as part of a subsequent process of the radio measurement locating processes, or second messages received by the first mobile device from the at least some of the plurality of anchors as part of the subsequent process.

2. The method of claim 1, wherein the RF training set includes radio measurements for at least some of the plurality of messages, wherein the radio measurements are utilized by the radio measurement locating processes for determining the locations for the one or more mobile devices within the demarcated area.

3. The method of claim 1, further comprising receiving, by the processing system, the RF characteristics for the plurality of messages from the plurality of anchors, wherein the processing system is part of a server that is a separate device from the plurality of anchors.

4. The method of claim 1, wherein the processing system is part of the first mobile device.

5. The method of claim 1, wherein the RF characteristics comprise Received Signal Strength.

6. The method of claim 1, wherein the RF characteristic comprise Channel Impulse Response.

7. The method of claim 1, wherein the plurality of messages comprises range request messages sent from at least one of the one or more mobile devices.

8. The method of claim 1, wherein the plurality of messages comprises one or more range request messages sent from one or more of the plurality of anchors and range response messages sent from one or more of the plurality of anchors.

9. The method of claim 1, wherein the plurality of messages comprises range response messages sent from at least one of the one or more mobile devices.

10. The method of claim 1, wherein the plurality of messages comprises range response messages sent from the plurality of anchors.

11. The method of claim 1, wherein the machine learning process comprises one of support vector machines, neural networks, K-nearest neighbors, gradient boosting, or a combination thereof.

12. The method of claim 1, wherein the first location for the first mobile device is determined as one of an estimated position within the demarcated area or a particular zone of mapped zones for the demarcated area.

13. The method of claim 1, wherein the determining the first location according to the RF fingerprint model results in an RF-based location, and further comprising:
    determining, by the processing system according to one of the radio measurement locating processes, the first location for the first mobile device according to particular radio measurements of at least some messages of a group of messages comprising the first messages, the second messages, third messages or a combination thereof resulting in a RM-based location, the third messages being between pairs of the plurality of anchors; and
    performing a comparison, selection, combining or any combination thereof, by the processing system, of the RF-based location and the RM-based location.

14. A first mobile device, comprising:
a processing system including a processor; and
a memory that stores executable instructions that, when executed by the processing system, facilitate performance of operations, the operations comprising:
receiving first messages comprising messages transmitted from the first mobile device to one or more of a plurality of anchors as part of a subsequent locating process of radio measurement locating processes; and
determining particular RF characteristics from the first messages,
wherein a first location for the first mobile device is determined based on a Radio Frequency (RF) fingerprint model according to the particular RF characteristics of the first messages,
wherein the RF fingerprint model is for a demarcated area associated with the plurality of anchors,
wherein the RF fingerprint model is generated from an RF training set by a machine learning process,
wherein the RF training set is generated from RF characteristics determined from a plurality of messages and from locations determined for one or more mobile devices within the demarcated area,
wherein the plurality of messages is wirelessly transmitted as part of the radio measurement locating processes for the one or more mobile devices, and
wherein the radio measurement locating processes determine the locations for the one or more mobile devices within the demarcated area using the plurality of anchors and a time difference of arrival process, a two-way time of arrival process, an angle of arrival process, or a combination thereof.

15. The first mobile device of claim 14, wherein the determining the first location according to the RF fingerprint model results in a RF-based location, wherein the first location for the first mobile device is further determined, utilizing one of the radio measurement locating processes, according to particular radio measurements of at least some messages of a group of messages comprising the first messages, second messages or a combination thereof resulting in a RM-based location, wherein the second messages are between pairs of the plurality of anchors, and wherein a comparison, selection, combining, or any combination thereof is performed of the RF-based location and the RM-based location.

16. The first mobile device of claim 14, wherein the RF characteristics comprise Received Signal Strength, Channel Impulse Response, or a combination thereof.

17. The first mobile device of claim 14, wherein the first messages are received from at least some of the plurality of anchors, and wherein the plurality of messages comprises range response messages sent from at least some of the plurality of anchors.

18. A non-transitory, machine-readable medium comprising executable instructions that, when executed by a processing system including a processor, facilitate performance of operations, the operations comprising:
accessing an RF fingerprint model for a demarcated area associated with a plurality of anchors, the RF fingerprint model generated from a Radio Frequency (RF) training set by a machine learning process, the RF training set generated from RF characteristics for a plurality of messages and from locations determined for one or more mobile devices within the demarcated area using the plurality of anchors, the RF characteristics determined from the plurality of messages that are wirelessly transmitted as part of radio measurement locating processes for the one or more mobile devices, the radio measurement locating processes determining the locations for the one or more mobile devices within the demarcated area using the plurality of anchors and a time difference of arrival process, a two-way time of arrival process, an angle of arrival process, or a combination thereof; and
determining, according to the RF fingerprint model, a first location for a first mobile device according to particular RF characteristics determined from first messages being transmitted by the first mobile device to the plurality of anchors as part of a subsequent locating process of the radio measurement locating processes.

19. The non-transitory, machine-readable medium of claim 18, wherein the determining the first location according to the RF fingerprint model results in a RF-based location, and wherein the operations further comprise:
determining, according to one of the radio measurement locating processes, the first location for the first mobile device according to particular radio measurements of at least some messages of a group of messages comprising the first messages, second messages or a combination thereof resulting in a RM-based location, the second messages being between pairs of the plurality of anchors; and
performing a comparison, selection, combining or any combination thereof, of the RF-based location and the RM-based location.

\* \* \* \* \*